United States Patent
Kobayashi

(10) Patent No.: US 8,306,004 B2
(45) Date of Patent: Nov. 6, 2012

(54) COMMUNICATION NETWORK SYSTEM HAVING HIGH-RANKING NETWORK AND LOW-RANKING NETWORKS, INTERCHANGE TERMINAL CONNECTING HIGH-RANKING NETWORK AND LOW-RANKING NETWORK, MICROCOMPUTER CONTROLLING CONNECTION BETWEEN TRANSMISSION LINE OF LOW-RANKING NETWORK AND TRANSMISSION LINE OF HIGH-RANKING NETWORK, AND COMMUNICATION TRANSMITTER-RECEIVER CONNECTED WITH TRANSMISSION LINE OF LOW-RANKING NETWORK AND TRANSMISSION LINE OF HIGH-RANKING NETWORK

(75) Inventor: Masayuki Kobayashi, Anjo (JP)

(73) Assignee: Denso Corporation, Kariya (JP)

( * ) Notice: Subject to any disclaimer, the term of this patent is extended or adjusted under 35 U.S.C. 154(b) by 112 days.

(21) Appl. No.: 12/932,951

(22) Filed: Mar. 10, 2011

(65) Prior Publication Data

US 2011/0223955 A1    Sep. 15, 2011

(30) Foreign Application Priority Data

Mar. 15, 2010    (JP) ................ 2010-057704

(51) Int. Cl.
    *H04B 7/00*    (2006.01)
(52) U.S. Cl. ......... 370/338; 370/328; 370/402; 455/513
(58) Field of Classification Search .............. 370/338, 370/328, 402; 455/513
    See application file for complete search history.

(56) References Cited

U.S. PATENT DOCUMENTS

| | | |
|---|---|---|
| 2005/0254518 A1 | 11/2005 | Fujimori |
| 2011/0026538 A1 | 2/2011 | Takeuchi et al. |

FOREIGN PATENT DOCUMENTS

| | | |
|---|---|---|
| JP | 2005-328119 | 11/2005 |
| JP | 2008-022399 | 1/2008 |
| JP | 2009-027358 | 2/2009 |
| JP | 2009-094748 | 4/2009 |
| JP | 2009-239453 | 10/2009 |
| JP | 2009-286191 | 12/2009 |

OTHER PUBLICATIONS

Office Action dated May 29, 2012 from corresponding Japanese patent application No. 2010-057704 with English translation thereof.

*Primary Examiner* — Dang Ton
*Assistant Examiner* — Pamit Kaur
(74) *Attorney, Agent, or Firm* — Harness, Dickey & Pierce, PLC

(57) ABSTRACT

A communication network system has a host network and low-ranking networks connected with the host network through respective interchange terminals. Terminals containing the interchange terminals in the host network perform communication based on FlexRay. FlexRay sets a static segment and a dynamic segment every communication period. Communication zones are fixedly allocated to the respective terminals in each static segment. Communication zones are changeably allocated to the respective terminals in each dynamic segment. Terminals of each low-ranking network perform communication based on LIN or CAN protocol. The interchange terminals connect a transmission line of the host network with transmission lines of the low-ranking networks during the transmission period of each dynamic segment, so that each terminal of each low-ranking network can perform communication based on LIN or CAN protocol with the terminals of the other low-ranking networks through the high-ranking network without any protocol conversion.

14 Claims, 11 Drawing Sheets

FlexRay COMMUNICATION FRAME

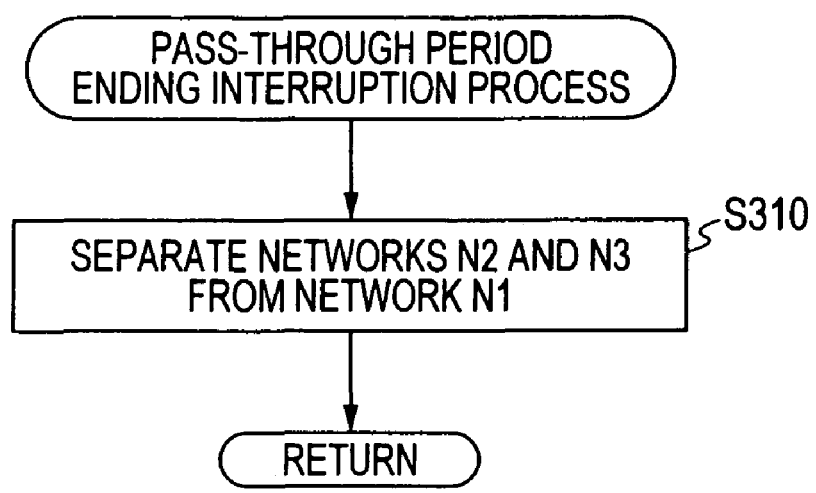
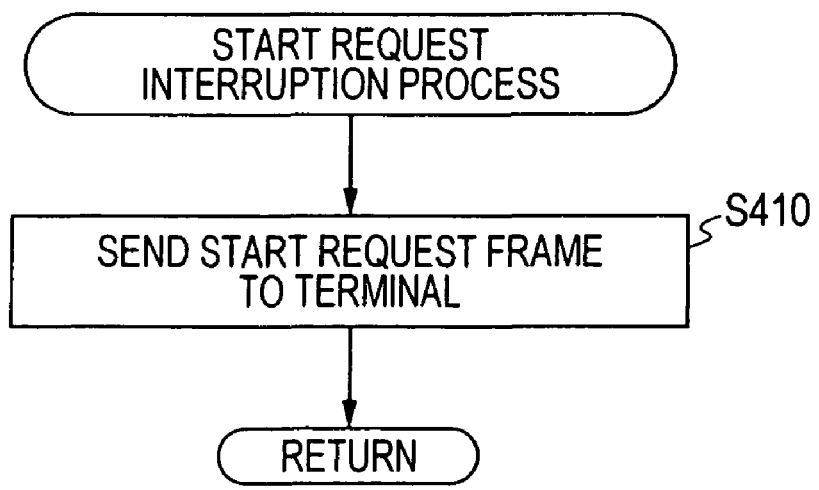

COMMUNICATION NETWORK SYSTEM HAVING HIGH-RANKING NETWORK AND LOW-RANKING NETWORKS, INTERCHANGE TERMINAL CONNECTING HIGH-RANKING NETWORK AND LOW-RANKING NETWORK, MICROCOMPUTER CONTROLLING CONNECTION BETWEEN TRANSMISSION LINE OF LOW-RANKING NETWORK AND TRANSMISSION LINE OF HIGH-RANKING NETWORK, AND COMMUNICATION TRANSMITTER-RECEIVER CONNECTED WITH TRANSMISSION LINE OF LOW-RANKING NETWORK AND TRANSMISSION LINE OF HIGH-RANKING NETWORK

CROSS-REFERENCE TO RELATED APPLICATION

This application is based upon and claims the benefit of priority of the prior Japanese Patent Application 2010-57704 filed on Mar. 15, 2010, so that the contents of which are incorporated herein by reference.

BACKGROUND OF THE INVENTION

1. Field of the Invention

The present invention relates to a communication network system which has a high-ranking network employing a first communication protocol and a plurality of low-ranking networks employing a second communication protocol different from the first communication protocol, connected with one another through the high-ranking network, an interchange terminal connecting one of the low-ranking networks and the high-ranking network for each low-ranking network, a microcomputer of each interchange terminal which connects a transmission line of the low-ranking network with a transmission line of the high-ranking network without placing a microcomputer body between lines or separates the lines from each other, and a communication transmitter-receiver of each interchange terminal which is connected with the transmission line of the low-ranking network and the transmission line of the high-ranking network.

2. Description of Related Art

A communication protocol employed for a controller area network (CAN) or a local interconnect network (LIN) has been used for an on-board communication network system of a vehicle. Further, because high transmission speed and high reliability are important in the communication network system, FlexRay registered as a trademark has been recently used as a communication protocol for the communication network system.

Moreover, different communication protocols have been mixedly used in a single communication network system of a vehicle. In this case, as disclosed in the patent document of Published Japanese Patent First Publication No. 2009-027358, a gateway is used to connect communication networks, employing different communication protocols, with each other, and the protocol conversion is performed in the gateway.

Furthermore, as disclosed in the patent document of Published Japanese Patent First Publication No. 2005-328119, resources such as electronic control units (ECUs) and control programs designed for CAN have been effectively used for a communication network employing the FlexRay. More specifically, each of the ECUs is designed so as to have the same function as the function (i.e., protocol conversion) of the gateway, and these ECUs designed for CAN are used for a communication network employing the FlexRay.

In a network system based on these patent documents, a plurality of CANs employing a CAN protocol are, for example, connected with one another through a FlexRay communication network employing the FlexRay, and ECUs are used for each CAN. These ECUs are operated in response to data (hereinafter, called CAN protocol data) prepared based on the CAN protocol. In this case, even when CAN protocol data is transmitted between CANs through the FlexRay communication network to use the data only in the ECUs of the CANs, the protocol conversion is performed for the data in the FlexRay communication network.

Therefore, when error or problem in data communication from a first CAN to a second CAN occurs in the second CAN, the analysis of only signals transmitted in the second CAN is insufficient to investigate the cause of the error or problem. For this investigation, it is also required to analyze signals transmitted in the FlexRay communication network and to inspect software programs of the gateway executing the protocol conversion for the CAN protocol data. As a result, many inspection devices are needed, and it takes a long time to investigate error or problem occurring in the transmission of CAN protocol data through the FlexRay communication network.

SUMMARY OF THE INVENTION

An object of the present invention is to provide, with due consideration to the drawbacks of the conventional communication network system, a communication network system which has a high-ranking network employing a first communication protocol and a plurality of low-ranking networks, employing a second communication protocol different from the first communication protocol, connected with one another through the high-ranking network so as to easily investigate the cause of problems or errors occurring in one low-ranking network in data communication.

Another object of the present invention is to provide an interchange terminal unit connecting each low-ranking network and the high-ranking network.

A still further object of the present invention is to provide a microcomputer of each interchange terminal which control the communication between the host network and the low-ranking network by connecting a transmission line of the low-ranking network with a transmission line of the high-ranking network without placing a microcomputer body between lines or separating the lines from each other.

A still further object of the present invention is to provide a communication transmitter-receiver of each interchange terminal which is connected with the transmission line of the low-ranking network and the transmission line of the high-ranking network.

According to a first aspect of this invention, the object is achieved by the provision of a communication network system comprising a high-ranking network and a plurality of low-ranking networks. In the high-ranking network, a plurality of terminals containing a plurality of interchange terminals communicate with one another through a first communication line by employing a first communication protocol. The first communication protocol sets a fixed allocation period and a dynamic allocation period every communication period of a fixed length. Communication zones are fixedly allocated to the respective terminals in each fixed allocation period. Communication zones are changeably allocated to the respective terminals in each dynamic allocation period.

The low-ranking networks are connected with the high-ranking network through the respective interchange terminals. A plurality of low-ranking connection terminals communicate with one another through a second communication line in each low-ranking network by employing a second communication protocol different from the first communication protocol. The interchange terminals set at least apart of each dynamic allocation period as a pass-through period. The interchange terminals connect the second communication lines of the low-ranking networks with the first communication line of the high-ranking network during each pass-through period to enable each low-ranking connection terminal of each low-ranking network to communicate with the low-ranking connection terminals of the other low-ranking networks through the high-ranking network during the pass-through period by employing the second communication protocol without any protocol conversion.

With this structure of the communication network system, because the interchange terminals connect the second communication lines of the low-ranking networks with the first communication line of the high-ranking network during each pass-through period, data based on the second communication protocol can be transmitted from each low-ranking connection terminal of each low-ranking network to the low-ranking connection terminals of, the other low-ranking networks through the first communication line of the high-ranking network without passing through any microcomputer performing protocol conversion. Therefore, this data transmission can be performed without any protocol conversion of communication frames based on the second communication protocol to communication frames based on the first communication protocol.

Accordingly, when it is required to investigate the cause of problems or errors occurring in one low-ranking network in data communication, it is not required to inspect software programs for the protocol conversion, but it is sufficient to analyze signals transmitted in the low-ranking network by using only an inspection device for the low-ranking network. That is, the investigation for clearing up the cause of problems or errors can be simplified, and the period of time required to investigate the cause of problems or errors can be shortened.

According to a second aspect of this invention, the object is achieved by the provision of an interchange terminal which connects a high-ranking network with one of a plurality of low-ranking networks for each of the low-ranking networks. A plurality of terminals containing the interchange terminals communicate with one another through a first communication line in the high-ranking network by employing a first communication protocol. The first communication protocol sets a fixed allocation period and a dynamic allocation period every communication period of a fixed length. Communication zones are fixedly allocated to the respective terminals of the high-ranking network in each fixed allocation period. Communication zones are changeably allocated to the respective terminals of the high-ranking network in each dynamic allocation period. A plurality of low-ranking connection terminals communicate with one another through a second communication line in each low-ranking network by employing a second communication protocol different from the first communication protocol.

The interchange terminal corresponding to each low-ranking network comprises a control unit, a transmission path connection unit and a request sending unit. The control unit sets at least a part of each dynamic allocation period as a pass-through period. The transmission path connection unit connects the communication line of the low-ranking network with the communication line of the high-ranking network during each pass-through period set by the control unit. Each low-ranking connection terminal of the low-ranking network is enabled to communicate with the low-ranking connection terminals of the other low-ranking networks, of which the second communication lines are connected with the first communication line of the high-ranking network by the other interchange terminals, during each pass-through period without any protocol conversion. The request sending unit sends a request frame to one low-ranking connection terminal of the low-ranking network to instruct the low-ranking connect ion terminal to send a communication frame based on the second communication protocol to one low-ranking connection terminal of another low-ranking network through the high-ranking network in one pass-through period in response to the request frame.

With this structure of the interchange terminal, the interchange terminal can be appropriately used to provide the communication network system having the high-ranking network and the low-ranking networks.

According to a third aspect of this invention, the object is achieved by the provision of a microcomputer of an interchange terminal, comprising a first port, a second port, a transmission path connection circuit, and a microcomputer body integrally formed with the transmission path connection circuit. The first port is connected with a transmission line of a high-ranking network in which a plurality of terminals containing the interchange terminal perform communication based on a first communication protocol. The first communication protocol sets a fixed allocation period and a dynamic allocation period every communication period of a fixed length. Communication zones are fixedly allocated to the respective terminals of the high-ranking network in each fixed allocation period. Communication zones are changeably allocated to the respective terminals of the high-ranking network in each dynamic allocation period. The second port is connected with a transmission line of a first low-ranking network in which a plurality of low-ranking connection terminals perform communication based on a second communication protocol different from the first communication protocol. The transmission path connection circuit is connected with the first port and the second port. The microcomputer body sets at least a part of each dynamic allocation period as a pass-through period, sets each communication period other than the pass-through period as anon-pass-through period, controls the transmission path connection circuit to directly connect the second port with the first port in each pass-through period and to separate the second port from the first port in each non-pass-through period. Communication based on the second communication protocol is enabled in the pass-through period between each low-ranking connection terminal of the first low-ranking network and a terminal of a second low-ranking network, having a transmission line connected with the transmission line of the high-ranking network, through the high-ranking network without any protocol conversion. Communication based on the first communication protocol is performed in the non-pass-through period between the microcomputer body and one terminal of the high-ranking network.

With this structure of the microcomputer, the microcomputer can be appropriately used to provide, the interchange terminal.

According to a fourth aspect of this invention, the object is achieved by the provision of a communication driver-receiver of an interchange terminal, comprising a first driver-receiver transmission line, a second driver-receiver transmission line, a driver-receiver body, and a transmission path connection circuit integrally formed with the driver-receiver body. The first driver-receiver transmission line is connected with a transmission line of a high-ranking network in which a plurality of terminals containing the interchange terminal perform communication based on a first communication protocol. The first communication protocol sets a fixed allocation period and a dynamic allocation period every communication period of a fixed length. Communication zones are fixedly allocated to the respective terminals of the high-ranking network in each fixed allocation period. Communication zones are changeably allocated to the respective terminals of the high-ranking network in each dynamic allocation period.

The second driver-receiver transmission line is connected with a transmission line of a low-ranking network in which a plurality of low-ranking connection terminals perform communication based on a second communication protocol different from the first communication protocol. The driver-receiver body is connected with an end of one of the driver-receiver transmission lines so as to locate the driver-receiver body between the driver-receiver transmission line and the corresponding network.

The transmission path connection circuit receives a first control signal indicating that at least a part of each dynamic allocation period is set as a pass-through period and receives a second control signal indicating that each communication period other than the pass-through period is set as a non-pass-through period. The transmission path connection circuit connects the first driver-receiver transmission line and the second driver-receiver transmission line in each pass-through period according to the first control signal to connect the transmission line of the high-ranking network and the transmission line of the low-ranking network through the driver-receiver body. The transmission path connection circuit separates the first driver-receiver transmission line from the second driver-receiver transmission line in each non-pass-through period according to the second control signal to separate the transmission line of the low-ranking network from the transmission line of the high-ranking network.

With this structure of the communication driver-receiver, the communication driver-receiver can be appropriately used to provide the interchange terminal.

BRIEF DESCRIPTION OF THE DRAWINGS

FIG. 9 is a flow chart showing a pass-through period ending interruption process performed in the network system according to the first embodiment;

FIG. 10 is a flow chart showing a start request interruption process performed in the network system according to the first embodiment;

DETAILED DESCRIPTION OF THE PREFERRED EMBODIMENTS

Embodiments of the present invention will now be described with reference to the accompanying drawings.

First Embodiment

Figure 1:
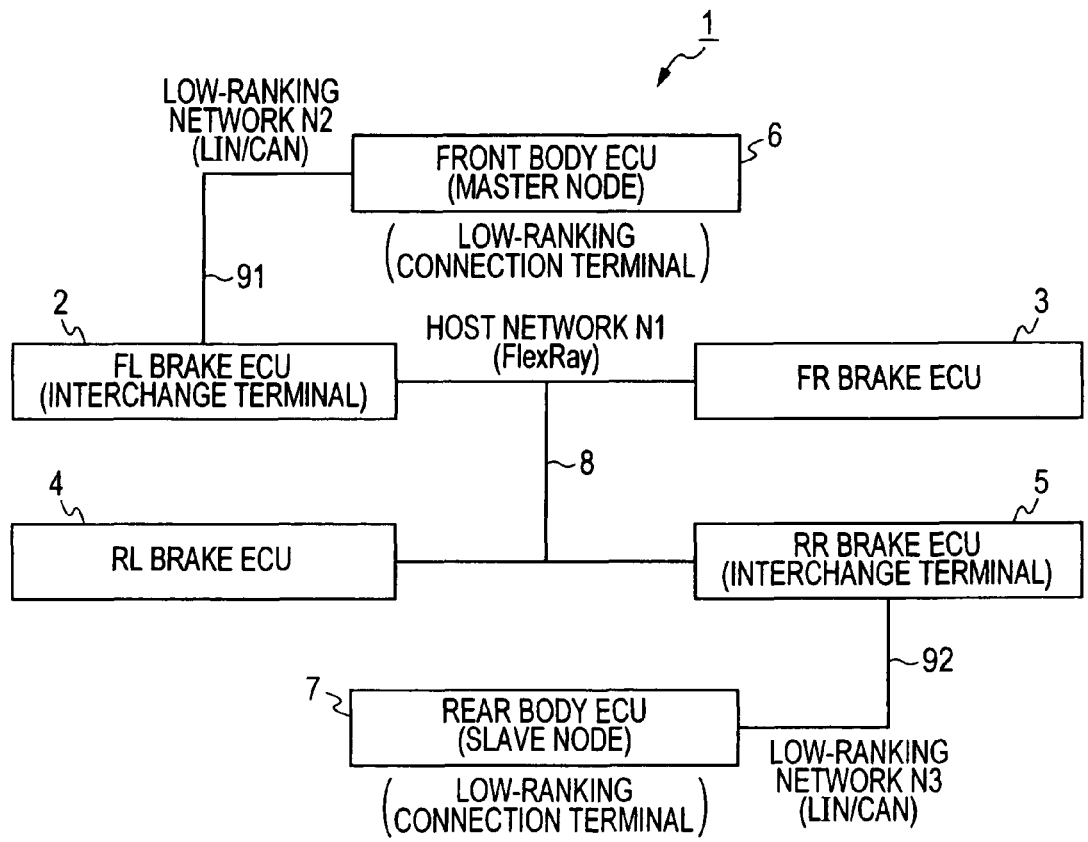
FIG. 1 is a block diagram of an on-board communication network system according to first and second embodiments of the present invention.

FIG. 1 is a block diagram of an on-board communication network system according to the first embodiment. As shown in FIG. 1, an on-board communication network system 1 mounted on a vehicle has a plurality of electronic control units (ECUs) of the brake system such as a front-left (FL) brake ECU 2, a front-right, (FR) brake ECU 3, a rear-left (RL) brake ECU 4 and a rear-right (RR) brake ECU 5. The ECU 2 performs the braking control for a wheel located at the front and left position of the vehicle. The ECU 3 performs the braking control for a wheel located at the rear and right position of the vehicle. The ECU 4 performs the braking control for a wheel located at the rear and left position of the vehicle. The ECU 5 performs the braking control for a wheel located at the rear and right position of the vehicle. The ECUs 2 to 5 (i.e., terminals) are connected with one another through a transmission line 8 so as to constitute a host network (or a high-ranking network) N1 using FlexRay (hereinafter, called FlexRay protocol) as a communication protocol.

The system 1 further has a plurality of ECUs (i.e., terminals) of the body system such as a front body ECU 6. The ECU 6 controls body system devices such as a door lock device, a power window device, a meter device, an air conditioner and the like located at the front area of the vehicle. The ECU 2 and the ECUs (e.g., the ECU 6) are connected with one another through a transmission line 91 so as to constitute a low-ranking network N2 using a LIN communication protocol used for a local interconnect network (LIN).

The system 1 further has a plurality of ECUs (i.e., terminals) of the body system such as a rear body ECU 7. The ECU 7 controls body system devices located at the rear area of the vehicle. The ECU 5 and ECUs (e.g., the ECU 7) are connected with one another through a transmission line 92 so as to constitute another low-ranking network N3 using the LIN communication protocol.

Figure 2:
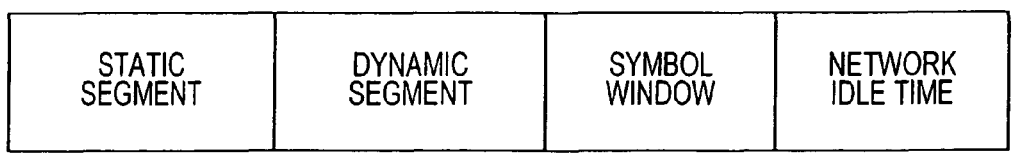
FIG. 2 is an explanatory view showing a FlexRay communication frame used in the network system shown in FIG. 1.

Each of the ECUs 2 to 5 receives and sends communication frames (hereinafter, called a FlexRay communication frame) prepared based on the FlexRay protocol from/to one of the other ECUs in the host network N1. As is well known, each FlexRay communication frame has a fixed length, and the frames are transmitted through the transmission line 8 of the host network N1 one after another. The period of time required to transmit each frame is fixed and denotes one communication period in the host network N1. The FlexRay communication frame will be described with reference to FIG. 2. FIG. 2 is an explanatory view showing the FlexRay communication frame of the host network N1.

As shown in FIG. 2, the FlexRay protocol sets the FlexRay communication frame which has a static segment composed of a plurality of fixed-length slots, a dynamic segment composed of a plurality of variable-length slots, a segment for a symbol window optionally used at a start up time, a wakeup time and the like, and a segment for a network idle time used for the offset of clock synchronization, the calculation of transmission speed, an error correction and the like. The fixed-length slots of the static segment are allocated to the respective ECUs 2 to 5 of the host network N1. Therefore, communication zones are fixedly allocated to the respective ECUs 2 to 5 during a fixed allocation period of the static segment. The variable-length slots of the dynamic segment are allocated to the respective ECUs 2 to 5. Therefore, communication zones are dynamically or changeably allocated to the respective ECUs 2 to 5 during a dynamic allocation period of the dynamic segment.

A communication frame (hereinafter, called a LIN communication frame) prepared based on the LIN communication protocol is used in the low-ranking networks N2 and N3. As is well known, the LIN communication frame has a header and a response.

In this specification, each of the ECUs 2 and 5 connected with both the transmission line 8 of the host network N1 and the transmission line 91 or 92 of one low-ranking network N2 or N3 is also called an interchange terminal, each of the ECUs 3 and 4 connected only with the transmission line 8 of the host network N1 is also called a host connection terminal (i.e., a high-ranking connection terminal), and each of the ECUs 6 and 7 connected only with the transmission line 91 or 92 of the low-ranking network N2 or N3 is also called a low-ranking connection terminal.

As described later in detail, the interchange terminals set the whole dynamic allocation period of each communication period or a part of the dynamic allocation period as a pass-through period and directly connect the communication lines 91 and 92 of the low-ranking networks N2 and N3 with the communication line 8 of the host network N1 during each pass-through period. The low-ranking connection terminals of the networks N2 and N3 is enabled to perform communication based on the LIN communication protocol through the high-ranking network N1 during the pass-through period without any protocol conversion of the LIN communication protocol to the FlexRay protocol.

Figure 3:
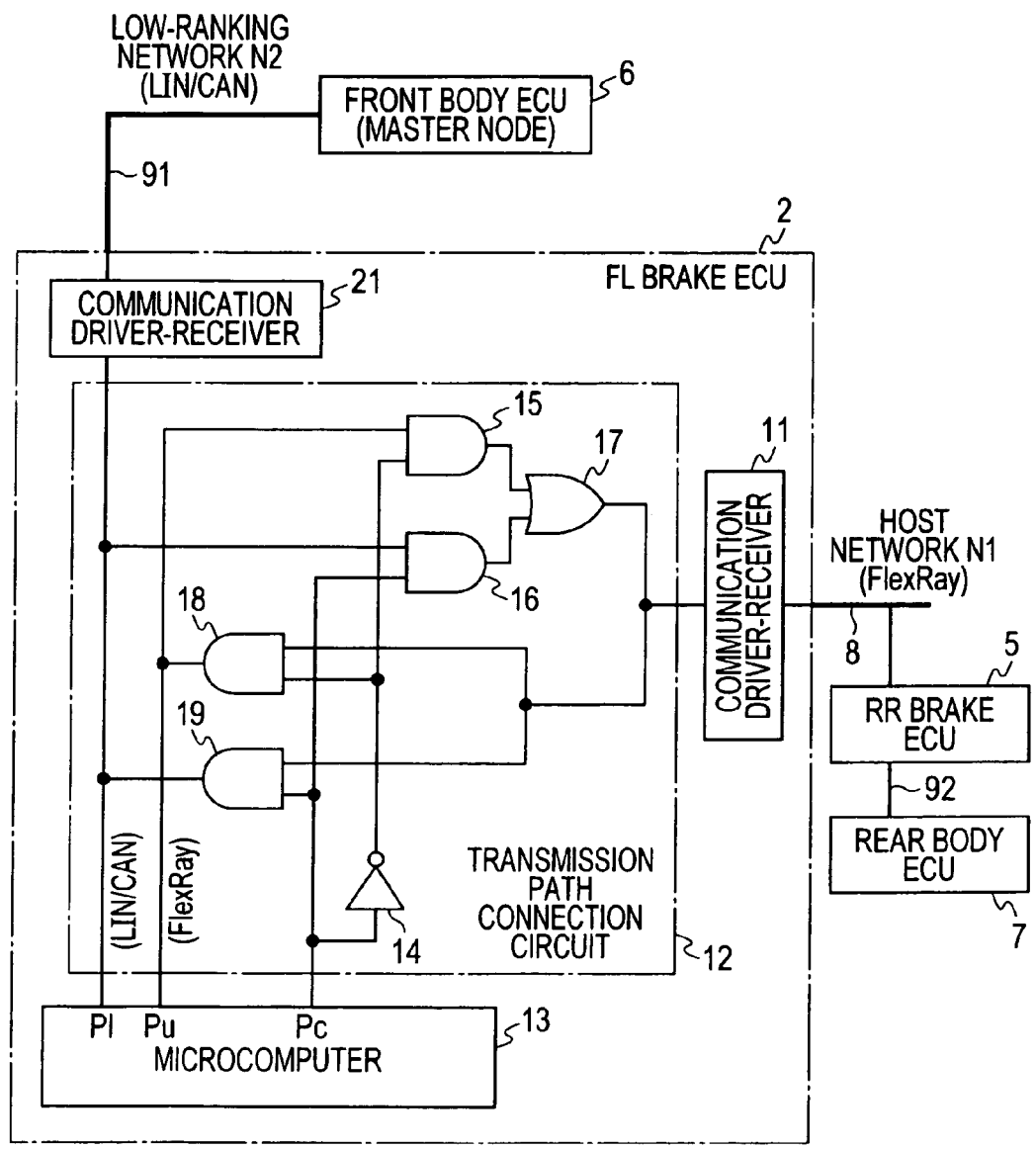
FIG. 3 is an explanatory view of an FL brake ECU representing an interchange terminal in the network system according to the first embodiment.

FIG. 3 is an explanatory view of the FL brake ECU 2 representing the interchange terminal. The FL brake ECU 5 acting as another interchange terminal has the same configuration as the configuration of the ECU 2. As shown in FIG. 3, the ECU 2 has a communication driver-receiver 11 for receiving and sending communication frames from/to the transmission line 8 of the host network N1, a communication driver-receiver 21 for receiving and sending LIN communication frames from/to the transmission line 91 of the low-ranking network N2, a transmission path connection circuit (or a transmission path connection unit) 12 connected with the transmission line 91 of the low-ranking network N2 and the transmission line 8 of the host network N1, and a microcomputer 13 with a control port Pc, a high-ranking port Pu and a low-ranking port Pl.

The microcomputer 13 outputs a first control signal or a second control signal from the port Pc to the circuit 12. In response to the first control signal, the circuit 12 directly connects the transmission line 91 of the low-ranking network N2 with the transmission line 8 of the host network N1, and the port Pl is connected with the transmission lines 8 and 91. In response to the second control signal, the circuit 12 separates the transmission line 91 of the low-ranking network N2 from the transmission line 8 of the host network N1 in data communication, and the port Pu is connected with the transmission line 8.

When the transmission path connection circuits 12 of all the interchange terminals (e.g., the ECUs 2 and 5) directly connect the transmission lines (e.g., the lines 91 and 92) of the low-ranking networks (e.g., the networks N2 and N3) with the transmission line 8 of the host network N1, the terminals (e.g., the ECUs 2 and 6) of each low-ranking network (e.g., the network N2) can perform data communication based on the LIN communication protocol with the terminals (e.g., the ECUs 5 and 7) of the other low-ranking networks (e.g., the network N3) without any protocol conversion. In contrast, when the circuit 12 of the ECU 2 separates the lines 8 and 91 from each other, the microcomputer 13 can perform data communication, using FlexRay communication frames prepared according to the FlexRay communication protocol, in the host network N1 through the port Pu. The microcomputer 13 performs various processes according to the received frames to fulfill various functions given to the ECU 2.

The connection circuit 12 has an inverting circuit (or NOT circuit) 14 for inverting the signal of the port Pc, a logic multiply circuit (or an AND circuit) 15 for receiving the output of the circuit 14 and the output of the port Pu and performing the logic multiply for the outputs, a logic multiply circuit (or an AND circuit) 16 for receiving the signal of the port Pc and a signal of the low-ranking network 91 (i.e., a signal received in the driver-receiver 21 or an output of the port Pl) and performing the logic multiply for the signals, and a logical add circuit (or an OR circuit) 17 for receiving outputs of the circuits 15 and 16, performing the logic add for the outputs, and outputting a signal indicating the logically-added result to the transmission line 8 of the host network N1 through the driver-receiver 11.

The connection circuit 12 further has a logic multiply circuit (or an AND circuit) 18 and a logic multiply circuit (or an AND circuit) 19. The AND circuit 18 receives the output of the circuit 14 and a signal of the host network 8 (i.e., a signal received in the driver-receiver 11), performs the logic multiply for the output and the signal, and outputs a signal indicating the logically-multiplied result to the port Pu. The AND circuit 19 receives the output of the control port Pc and a signal of the host network 8 (i.e., a signal received in the driver-receiver 11), performs the logic multiply for the output and the signal, and outputs a signal indicating the logically-multiplied result to the low-ranking port Pi and the driver-receiver 21.

When the microcomputer 13 of the ECU 2 sets the output of the control port Pc at the low level, the AND circuit 19 has one input terminal set at the low level so as to output the signal set at the low level to the low-ranking port Pl and the driver-receiver 21. Therefore, the line between the port Pl and the driver-receiver 21 is maintained at the low level, and the driver-receiver 21 disconnects this line maintained at the low level from the transmission line 91 of the network N2. That is, the low-ranking network N2 is separated from the host network N1 in data communication. Further, one input terminal of the AND circuit 16 connected with the port Pc is set at the low level, so that the circuit 16 outputs the signal set at the low level to one input terminal of the OR circuit 17. Therefore, the level at the output terminal of the circuit 17 becomes equal to the level at the other input terminal of the circuit 17. Moreover, the input terminal of the AND circuit 15 connected with the circuit 14 is set at the high level. In this case, the signal outputted from the port Pu can be sent to the other input terminal of the OR circuit 17 through the circuit 15 and can be sent to the driver-receiver 11 through the circuit 17. Therefore, the microcomputer 13 can send data from the port Pu to the transmission line 8 of the host network N1 through the driver-receiver 11. Furthermore, one input terminal of the AND circuit 18 connected with the circuit 14 is set at the high level, so that the level at the output terminal of the circuit 18 becomes equal to the level at the other input terminal of the circuit 18. Therefore, the microcomputer 13 can receive data at the port Pu from the transmission line 8 of the host network N1 through the driver-receiver 11 and the circuit 18.

When the microcomputer 13 of each interchange terminal (e.g., the ECU 2) sets the output of the control port Pc at the low level, the transmission line of the low-ranking network (e.g., the network N2) connected with the host network N1 through the interchange terminal is separated from the transmission line of the host network N1. The interchange terminal is enabled to perform the data communication in the host network N1, and all the low-ranking connection terminals (e.g., the ECU 6) of each low-ranking network are enabled to perform the data communication in the low-ranking network, independently of the data communication in the host network N1 or the data communication in the other low-ranking networks.

In this specification, the period of time, in which the microcomputer of each interchange terminal sets the output of the control port Pc at the low level, is called a non-pass-through period.

In contrast, when the microcomputer 13 of the ECU 2 sets the output of the control port Pc at the high level, the input terminal of the AND circuit 18 connected with the circuit 14 is set at the low level so as to set the output terminal of the circuit 18 at the low level. Therefore, the output line of the port Pu is set at the low level. Further, one input terminal of the AND circuit 15 connected with the circuit 14 is set at the low level so as to set the output terminal of the circuit 15 at the low level. Therefore, the input terminal of the OR circuit 17 connected with the circuit 15 is set at the low level, and the level at the output terminal of the circuit 17 becomes equal to the level at the other input terminal of the circuit 17 connected with the AND circuit 16. Moreover, the input terminal of the AND circuit 16 connected with the control port Pc of the microcomputer 13 is set at the high level, so that the level at the output terminal of the AND circuit 16 becomes equal to the level at the other input terminal of the AND circuit 16 connected with the port Pl and the driver-receiver 21.

Therefore, the signal received from the transmission line 91 of the low-ranking network N2 can be sent to the driver-receiver 11 through the AND circuit 16 and the OR circuit 17 without passing through the microcomputer 13, and the output of the low-ranking port Pl of the microcomputer 13 can be sent to the driver-receiver 11 through the AND circuit 16 and the OR circuit 17. In other words, data prepared in the low-ranking network N2 according to the LIN communication protocol can be directly sent to the transmission line 8 of the host network N1 without any protocol conversion, and the output prepared according to the LIN communication protocol can be directly sent to the transmission line 8 of the host network N1 without any protocol conversion.

Furthermore, one input terminal of the AND circuit 19 connected with the port Pc is set at the high level, so that the level at the output terminal of the circuit 19 becomes equal to the level at the other input terminal of the circuit 19. Therefore, data can be directly sent from the transmission line 8 of the host network N1 to the transmission line 91 of the low-ranking network N2 without passing through the microcomputer 13. Further, data can be directly sent from the transmission line 8 of the host network N1 to the port Pl of the microcomputer 13.

Because of this data transmission in the circuit 12, the transmission line 91 of the network N2 is directly connected with the transmission line 8 of the network N1 without placing the microcomputer 13 between the lines 8 and 91.

When the microcomputers 13 of all the interchange terminals (e.g., the ECUs 2 and 5) set the control ports Pc at the high level, the transmission line 8 of the host network N1 is directly connected with each of the transmission lines 91 and 92 of all the low-ranking networks N2 and N3 without placing the microcomputer 13 of the interchange terminal between the line 8 and the line of the low-ranking network. In other words, the transmission lines 91 and 92 of all the low-ranking networks N2 and N3 are connected with one another through the transmission line 8 of the host network N1 without placing the microcomputers of any interchange terminals. Therefore, a single network composed of all the networks N1 to N3 can be substantially formed. In this case, because data can be sent from one low-ranking network (e.g., the network N2) to another low-ranking network (e.g., the network N3) though the transmission line 8 of the host network N1 without passing through the microcomputer of any interchange terminal, the data communication using LIN communication frames can be performed among the terminals (e.g., the ECUs 2, 5, 6 and 7) of the low-ranking networks N2 and N3 without any protocol conversion of the LIN communication frames to FlexRay communication frames.

In this specification, the period of time, in which the microcomputers of all the interchange terminals set outputs of the control ports Pc at the high level, is called a pass-through period.

During the non-pass-through period set in one low-ranking network N2 or N3, the interchange terminal (e.g., the ECU 2 or 5) acts as a master node in the low-ranking network N2 or N3, and each of all the low-ranking connection terminals (e.g., the ECU 6 or 7) in the low-ranking network N2 or N3 acts as a slave node. In contrast, when one of the low-ranking connection terminals (e.g., the ECU 6) acting as slave nodes in one low-ranking network N2 or N3 receives a start request frame from the interchange terminal (e.g., the ECU 2) acting as one master node in the low-ranking network during the non-pass-through period, the low-ranking connection terminal receiving the start request frame is set as a master node during the pass-through period just after the non-pass-through period, and the other low-ranking connection terminals (e.g., the ECU 7) and all the interchange terminals (e.g., the ECUs 2 and 5) are set as slave nodes during the pass-through period.

In response to the reception of the start request frame, during the pass-though period, the low-ranking connection terminal (e.g., the ECU 6) set as the master node outputs the header of one LIN communication frame. In this header, one low-ranking connection terminal (e.g., the ECU 6 or 7), from which data should be transmitted, is specified, and this specified low-ranking connection terminal outputs data of the response so as to follow the header.

The microcomputer 13 of each of the interchange terminals (e.g., the ECUs 2 and 5) has a plurality of timers, and a time is preset in each timer. Each of these timers outputs an interruption signal when the preset time comes in the timer. Further, information about a reference timing is preset in each FlexRay communication frame of the host network N1. When the microcomputer 13 detects this reference timing at the host port Pu during the non-pass-through period, the microcomputer 13 generates a reference timing interrupt at the reference timing. The reference timing is, for example, set at a start time of the final fixed-length slot of the static segment in the FlexRay communication frame. When the microcomputer 13 detects the header of one LIN communication frame, transmitted from the master node (e.g., the ECU 6) of the corresponding low-ranking network, at the low-ranking port Pl during the non-pass-through period, the microcomputer 13 generates a LIN frame reception interruption.

Figure 4:
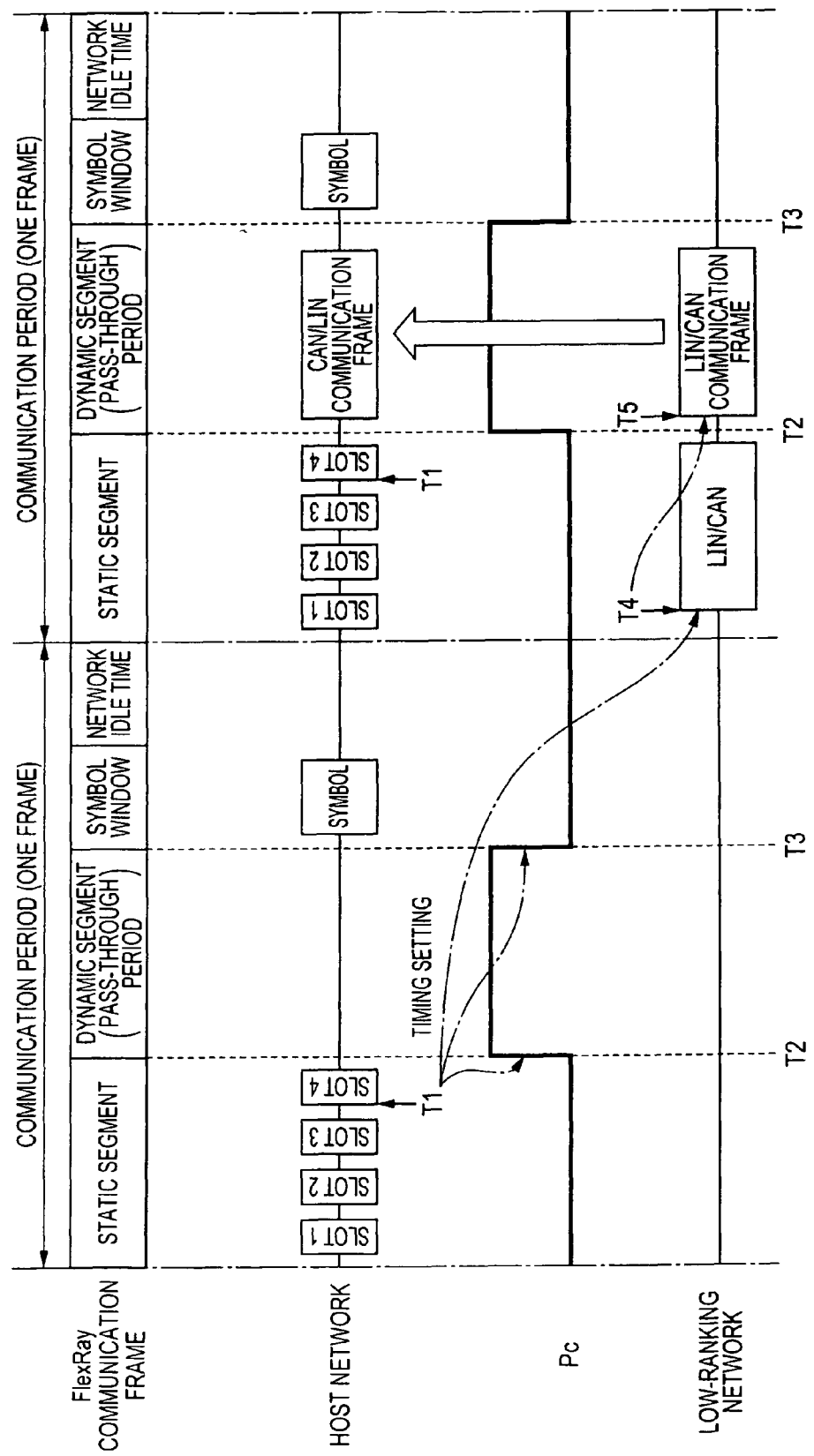
FIG. 4 is a timing chart showing the operation of the network system according to the first embodiment.

The operation of the communication network system 1 shown in FIG. 1 will be described with reference to FIG. 4 and FIG. 5. FIG. 4 is a timing chart showing the operation of the network system 1 according to the first embodiment, while FIG. 5 is a flow chart showing the operation performed in each interchange terminal according to the first embodiment.

When an ignition switch of the vehicle is turned on, electric power is supplied to the network system 1, and the operation of the network system 1 is started. As shown in FIG. 4, the terminals of the host network N1 transmit FlexRay communication frames one after another, and the interchange terminals (e.g., the ECUs 2 and 5) set the period of time for the transmission of the dynamic segment of each FlexRay communication frame as one pass-through period. In contrast, the interchange terminals set the FlexRay communication frame transmitting period other than the pass-through period as one non-pass-through period.

Figure 5:
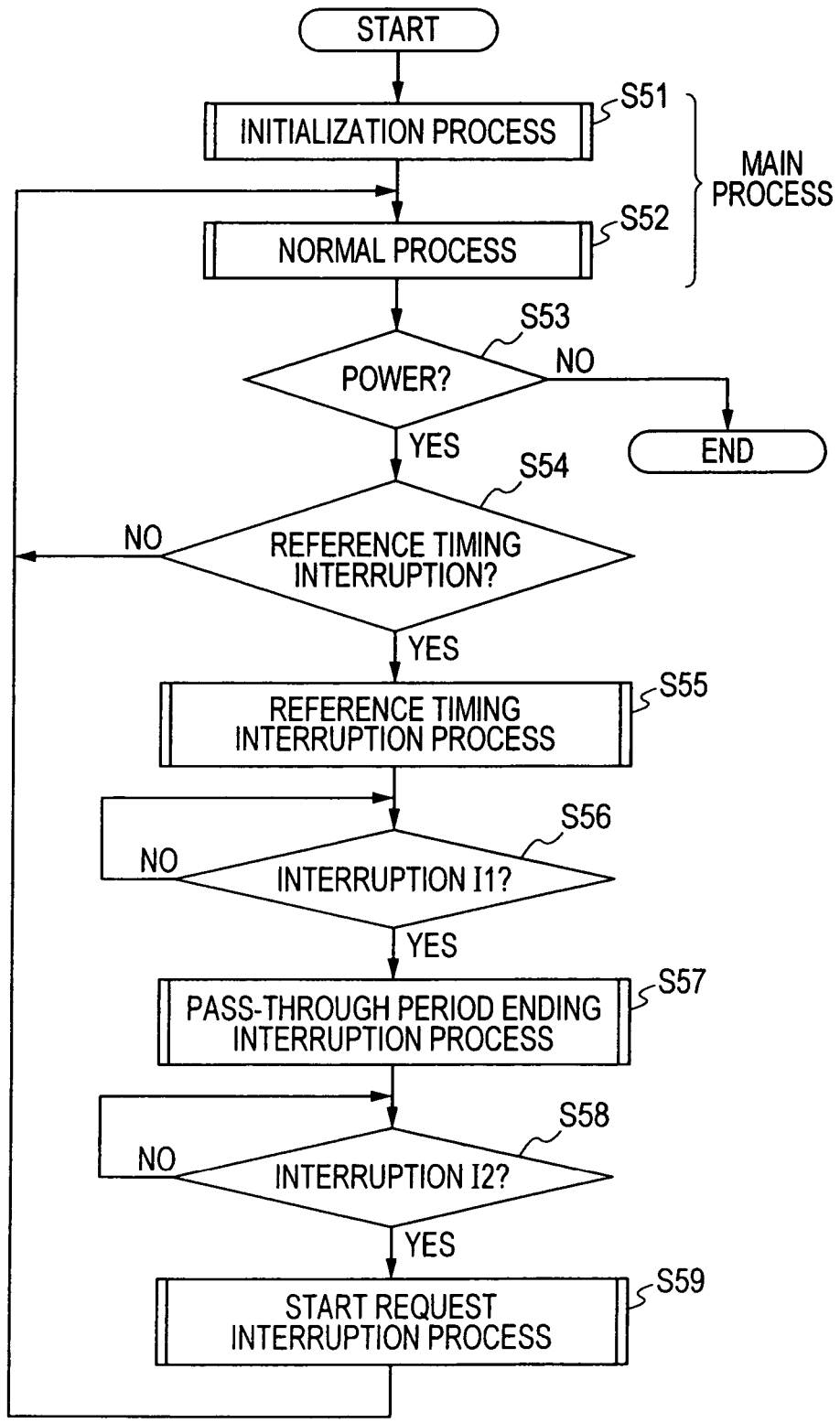
FIG. 5 is a flow chart showing the operation performed in each interchange terminal of the network system according to the first embodiment.

Then, as shown in FIG. 4 and FIG. 5, at step S51, the microcomputer 13 of each interchange terminal (e.g., the ECUs 2 and 5) performs an initialization process. For example, the microcomputer 13 initially sets the control port Pc at the low level to separate the corresponding low-ranking network from the host network N1 in data communication. Therefore, all the low-ranking networks N2 and N3 are separated from the host network N1 in data communication. That is, the network system 1 is set in the non-pass-through period.

At step S52, the microcomputer 13 receives and sends FlexRay communication frames from/to one of the other terminals in the host network N1 and performs a normal process according to the received frames. The combination of the initialization process and the normal process is called a main process. This main process is described later in detail. Then, at step S53, the microcomputer 13 judges whether or not the electric power is still supplied to the network system 1. When the supply of the electric power is stopped due to the turning off of the ignition key (NO at step S53), the operation of the network system 1 is ended. In contrast, when the electric power is still supplied (YES at step S53), at step S54, the microcomputer 13 judges whether or not a reference timing interruption occurs in the host network N1. This judgment is performed every predetermined period. A reference timing interruption is set so as to occur at a reference timing T1 of the FlexRay communication frame currently transmitted. This timing T1 is, for example, set at a start time of the final fixed-length slot of the static segment in the FlexRay communication frame. When no reference timing interruption occurs (NO at step S54), the procedure returns to step S52, and the microcomputer 13 again performs, the normal process.

In contrast, when a reference timing interruption occurs in the host network N1 (YES at step S54), at step S55, the microcomputer 13 waits until a start time T2 of the dynamic segment in the FlexRay communication frame, and starts a reference timing interruption process at the start time T2. In this process, the microcomputer 13 sets the control port Pc at the high level at the start time T2. Therefore, one pass-through period is started at the start time T2 of the dynamic segment, and all the low-ranking networks N2 and N3 are directly connected with the host network N1 so as to enable the transmission of LIN communication frames between low-ranking networks N2 and N3 through the host network N1 without any protocol conversion of the LIN communication frames. Further, the microcomputer 13 presets one timer such that the timer generates a pass-through period ending interruption I1 at an end time T3 of the dynamic segment to end this pass-through period at the end time T3. Moreover, the microcomputer 13 of the interchange terminal (e.g., the ECU 2) presets another timer such that the timer generates a start request interruption I2 at a start timing T4 to send a start request frame at the start timing T4 from this interchange terminal to one low-ranking connection terminal (e.g., the ECU 6) located in the same low-ranking network (e.g., the network N2). This start timing T4 is, for example, set to be placed in the static segment of the next FlexRay communication frame to send the start request frame in the next communication period. The start timing T4 is set so as to complete the transmission of the start request frame before the start of the dynamic segment (i.e., the next pass-through period). This reference timing interruption process is described later in detail.

Thereafter, at step S56, the microcomputer 13 of each interchange terminal judges whether or not the interruption I1 occurs. When the interruption I1 occurs at the end time T3 of the dynamic segment (YES at step S56), at step S57, the microcomputer 13 performs a pass-through period ending interruption process. More specifically, the microcomputer 13 sets the control port Pc at the low level. Therefore, all the low-ranking networks N2 and N3 are separated from the host network N1 in data communication. That is, the network system 1 is set in the non-pass-through period.

Thereafter, at step S58, the microcomputer 13 of the interchange terminal (e.g., the ECU 2) presetting the interruption I2 judges whether or not the interruption I2 occurs. When the timer interruption I2 occurs at the start timing T4 of the next FlexRay communication frame (YES at step S58), at step S59, the microcomputer 13 performs a start request interruption process. More specifically, the microcomputer 13 (i.e., a request sending unit) sends a start request frame from the low-ranking port Pl to one low-ranking connection terminal (e.g., the ECU 6) of this low-ranking network. In response to this frame, the terminal receiving the frame sends a LIN communication frame to one low-ranking connection terminal of the different low-ranking network (e.g., the network N3) through the host network N1 in the pass-through period of this FlexRay communication frame. Thereafter, the procedure returns to step S52.

In this operation, one start request frame is transmitted, and one LIN communication frame is transmitted in response to the start request frame. However, the transmission of LIN communication frames set at a maximum number is allowed during each pass-through period in the network system 1, the interchange terminals actually send a plurality of start request frames to a plurality of low-ranking connection terminals, and these low-ranking connection terminals actually output a plurality of LIN communication frames to the transmission lines of the low-ranking networks in response to the reception of the start request frames.

To transmit a plurality of LIN communication frames one after another during each pass-through period, the interchange terminals set each pass-through period such that a plurality of LIN communication frames set at the maximum number can be transmitted one after another in the network system 1 in the pass-through period. The interchange terminals send a plurality of start request frames, of which the number is equal to or smaller than the maximum number, one after another to low-ranking connection terminals of low-ranking networks so as to complete the sending of the start request frames at the start time T2 of each pass-through period. The low-ranking connection terminals receiving the start request frames send a plurality of LIN communication frames, of which the number is equal to or smaller than the maximum number, one after another to other low-ranking connection terminals through the host network N1 in the pass-through period.

Alternatively, to transmit a plurality of LIN communication frames one after another during each pass-through period, the interchange terminals set each pass-through period such that a plurality of start request frames and a plurality of LIN communication frames, which are set at the maximum number and are transmitted in response to the request frames, can be transmitted one after another in the pass-through period. The interchange terminals starts sending a plurality of request frames, of which the number is equal to or smaller than the maximum number, one after another to low-ranking connection terminals at the start time T2 of each pass-through period. The low-ranking connection terminals receiving the request frames prepare a plurality of communication frames based on the LIN communication protocol, of which the number is equal to or smaller than the maximum number, and send the communication frames one after another to other-ranking connection terminals through the host network N1 in the pass-through period.

Figure 6:
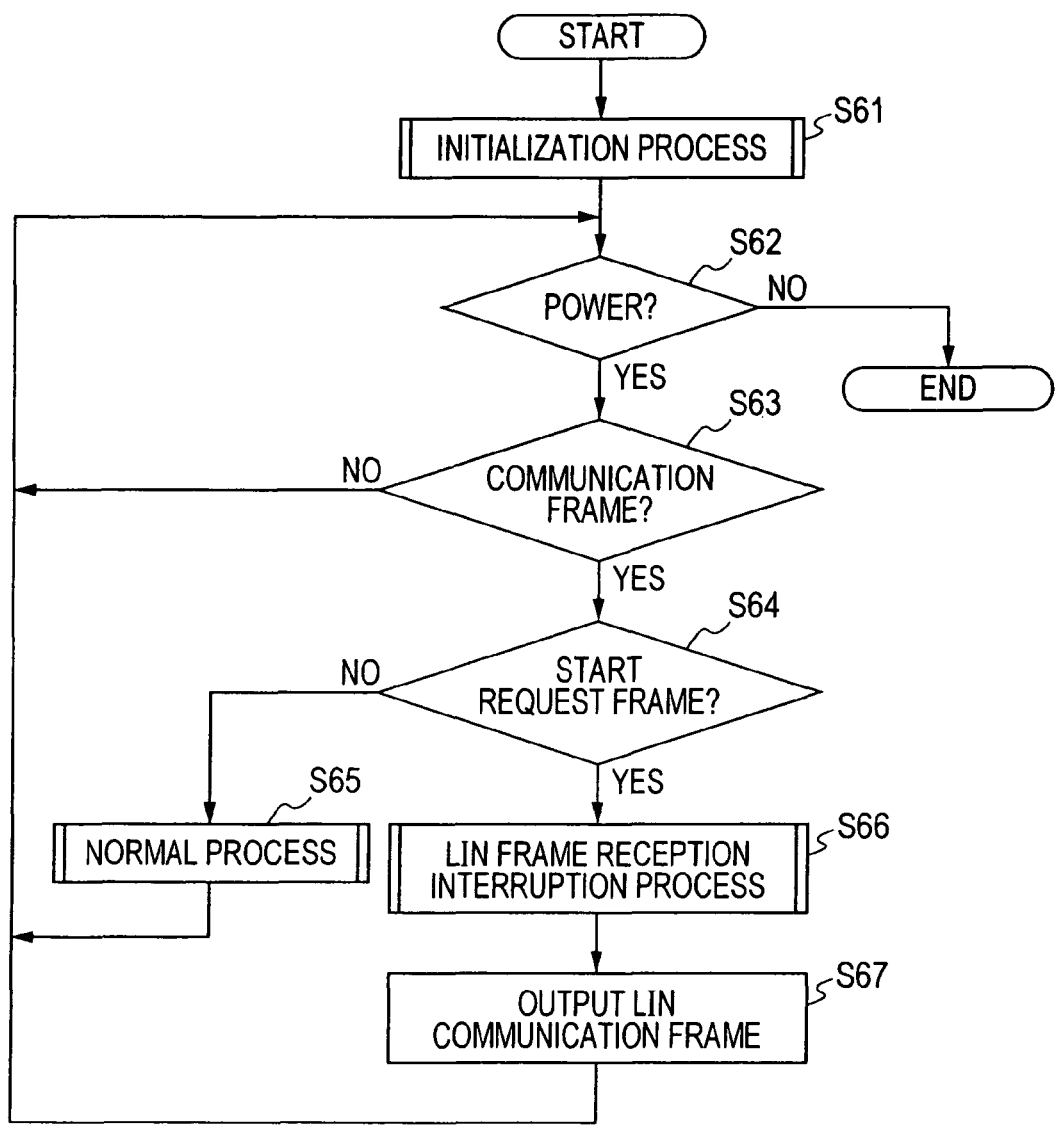
FIG. 6 is a flow chart showing the operation of each low-ranking connection terminal of the network system according to the first embodiment.

The operation of each low-ranking connection terminal shown in FIG. 1 will be described with reference to FIG. 6. FIG. 6 is a flow chart showing the operation of each low-ranking connection terminal according to the first embodiment. As shown in FIG. 6, when the electric power is supplied to the network system 1, at step S61, each low-ranking connection terminal performs an initialization process. This initialization process is described later in detail. Then, at step S62, the terminal judges whether or not the electric power is still supplied to the network system 1. When the supply of the electric power is stopped due to the turning off of the ignition key (NO at step S62), the operation of this terminal is ended. In contrast, when the electric power is still supplied (YES at step S62), at step S63, the terminal judges whether or not the terminal receives a LIN communication frame. When no LIN communication frame is received (NO at step S63), the procedure returns to step S62. In contrast, when the terminal receives a LIN communication frame (YES at step S63), at step S64, the terminal judges whether or not the received frame is a start request frame. When the received frame is not a start request frame (NO at step S64), at step S65, the terminal performs a normal process according to data of the request of the received frame, and the procedure returns to step S62.

In contrast, when the terminal (e.g., the ECU 6) set as the slave node in this non-pass-through period receives this start request frame (YES at step S64), at step S66, the terminal performs a LIN frame reception interruption process. More specifically, the terminal specifies the start time T2 of the dynamic segment (i.e., the start timing of the pass-through period) coming after the reception of the start request frame. Thereafter, when a frame outputting timing T5 placed in the specified dynamic segment (i.e., the specified pass-through period) comes (see FIG. 4), at step S67, the terminal set as the master node in this pass-through period outputs the header of a LIN communication frame from the low-ranking port P1 of the terminal to another low-ranking network (e.g., the network N3) through the host network N1. One terminal (e.g., the ECU 6 or 7) specified in the header outputs data of the response from the low-ranking port Pl of the terminal so as to follow the header. Then, the procedure returns to step S62.

Therefore, one low-ranking connection terminal (e.g., the ECU 7) of another low-ranking network (e.g., the network N3) specified in the header receives this LIN communication frame, having the header and the response, through the host network N1 and performs a process according to data of the response of the LIN communication frame.

As described above, the network system 1 has the host network N1 and the plurality of low-ranking networks N2 and N3. Each low-ranking network is connected with the host network N1 through one interchange terminal (e.g., the ECU 2 or 5) which belongs to both the host network N1 and the low-ranking network. The host network N1 performs the data communication by using FlexRay communication frames based on the FlexRay protocol. Each FlexRay communication frame has at least one static segment and one dynamic segment. Each of all the low-ranking networks N2 and N3 performs the data communication by using LIN communication frames based on the same LIN communication protocol. This LIN communication protocol differs from the FlexRay protocol.

Each interchange terminal sets the period of time, required for the transmission of the dynamic segment of each FlexRay communication frame in the host network N1, as the pass-through period. The interchange terminals connect the transmission line 8 of the host network N1 with each of the transmission lines 91 and 92 of all the low-ranking networks N2 and N3 during each pass-through period so as to form a single network. Accordingly, LIN communication frames prepared in one low-ranking network can be transmitted to any of the other low-ranking networks through the host network N1 during the pass-through period without converting the protocol of the LIN communication frames in the host network N1.

In contrast, during the non-pass-through period, each low-ranking network independently performs the data communication using LIN communication frames, and the data communication using FlexRay communication frames is performed in the host network N1.

Accordingly, in the network system 1 according to this first embodiment, even when problems or errors occur in the data communication performed in one low-ranking network in one pass-through period, the cause of these problems or errors can be investigated by analyzing signals transmitted in the low-ranking network. In this analysis, only the inspection device for LIN communication frames based on the LIN communication protocol is needed. Because no protocol conversion is performed for LIN communication frames transmitted through the network system 1, it is not required to check software programs used for the protocol conversion or to use the inspection device for FlexRay communication frames based on the FlexRay protocol. Because of not using inspection devices for FlexRay communication frames and not checking software programs used for the protocol conversion, the cause of the problems or errors can be easily investigated, and the period of time required for the investigation of the cause of the problems or errors can be considerably shortened.

Next, the structure of the host connection terminals and the low-ranking connect ion terminals will be described. Each of the host connection terminals (e.g., the ECUs 3 and 4) has a communication driver-receiver and a microcomputer with a host port (not shown). The microcomputer of this host connection terminal receives and sends FlexRay communication frames from/to the transmission line 8 of the host network N1 through the driver-receiver, and performs various processes predetermined in the terminal according to data written in the static segments of the received frames. For example, the microcomputer of the ECU 3 performs the brake control for the FR wheel of the vehicle, and the microcomputer of the ECU 4 performs the brake control for the RL wheel of the vehicle.

Each of the low-ranking connection terminals (e.g., the ECUs 6 and 7) has a microcomputer with a low-ranking port (not shown). The microcomputer of this terminal receives and sends LIN communication frames from/to the transmission line 91 or 92 of the low-ranking network N2 or N3, and performs various processes predetermined in the terminal according to data written in the responses of the received frames. For example, the ECU 6 controls the body system devices located at the front area of the vehicle, and the ECU 7 controls the body system devices located at the rear area of the vehicle.

Figure 7:
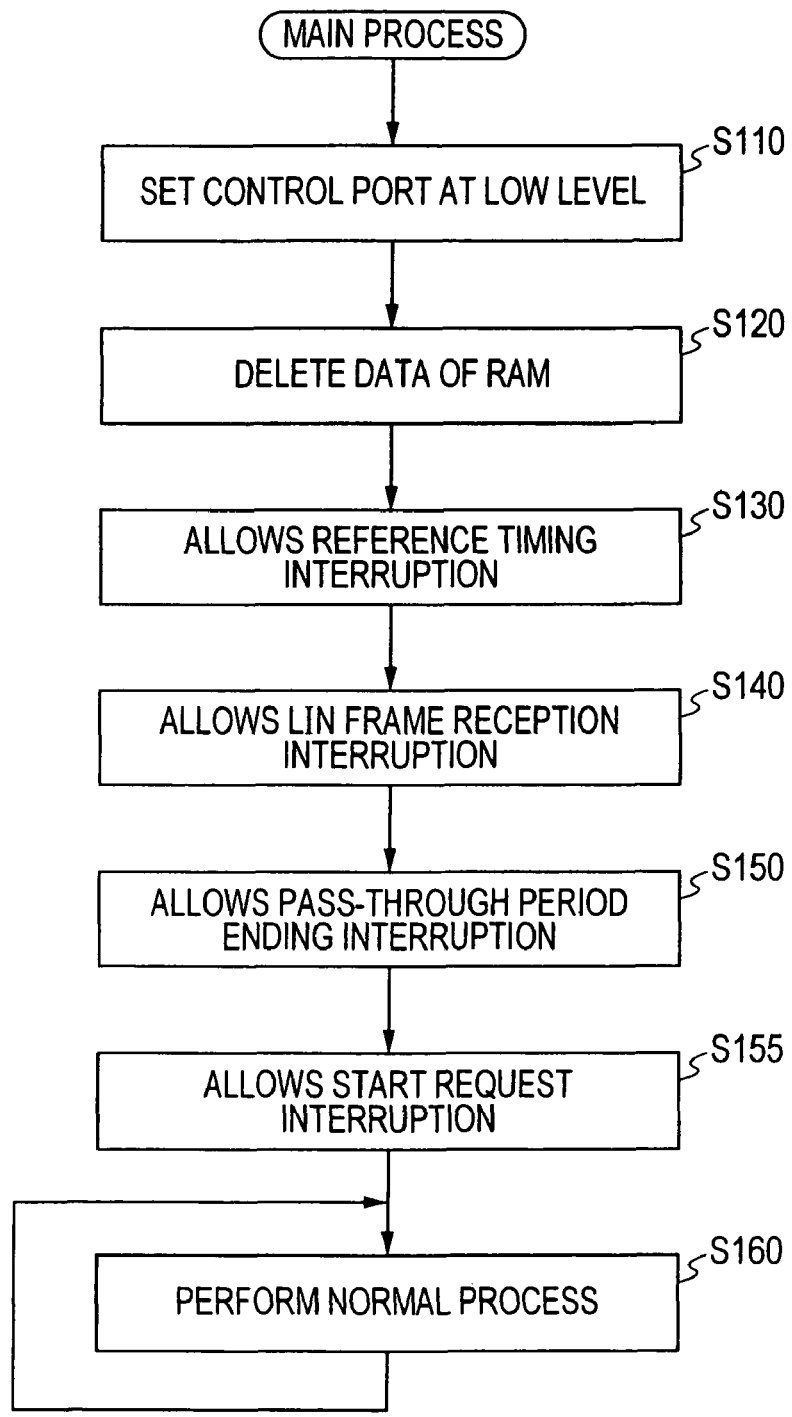
FIG. 7 is a flow chart showing a main process performed in each interchange terminal of the network system according to the first embodiment.

Next, the main process (see steps S51 and S52 in FIG. 5) performed in each interchange terminal (e.g., the ECU 2 or 5) will be described in detail with reference to FIG. 7. FIG. 7 is a flow chart showing the main process performed in each interchange terminal according to the first embodiment. As shown in FIG. 7, when the main process is started, at step S110, the microcomputer 13 of each interchange terminal sets the control port Pc at the low level for the initialization of the interchange terminal. Therefore, all the low-ranking networks N2 and N3 are separated from the host network N1 in data communication.

Then, at step S120, a random access memory (RAM) of the microcomputer 13 is initialized to delete data stored in the memory. At step S130, the microcomputer 13 allows a reference timing interruption, so that the host network N1 is initialized. Therefore, the interchange terminal is enabled for a reference timing interruption. This interruption occurs at the transmission time of the final fixed-length slot of the static segment of one FlexRay communication frame. At step S140, the microcomputer 13 allows a LIN frame reception interruption, so that the corresponding low-ranking network is initialized. Therefore, the interchange terminal is enabled for a LIN frame reception interruption. At step S150, the microcomputer 13 allows a pass-through period ending interruption I1. At step S155, the microcomputer 13 allows a start request interruption I2. Therefore, the interchange terminal is enabled for the interruptions I1 and I2. After the initialization at steps S110 to S155, at step S160, the microcomputer 13 repeatedly performs a normal process. In this normal process, the data communication among the interchange terminal and the host connection terminals is performed in the host network N1 through the transmission line 8, and each terminal of the host network N1 performs the brake control according to data received in the data communication.

Figure 8:
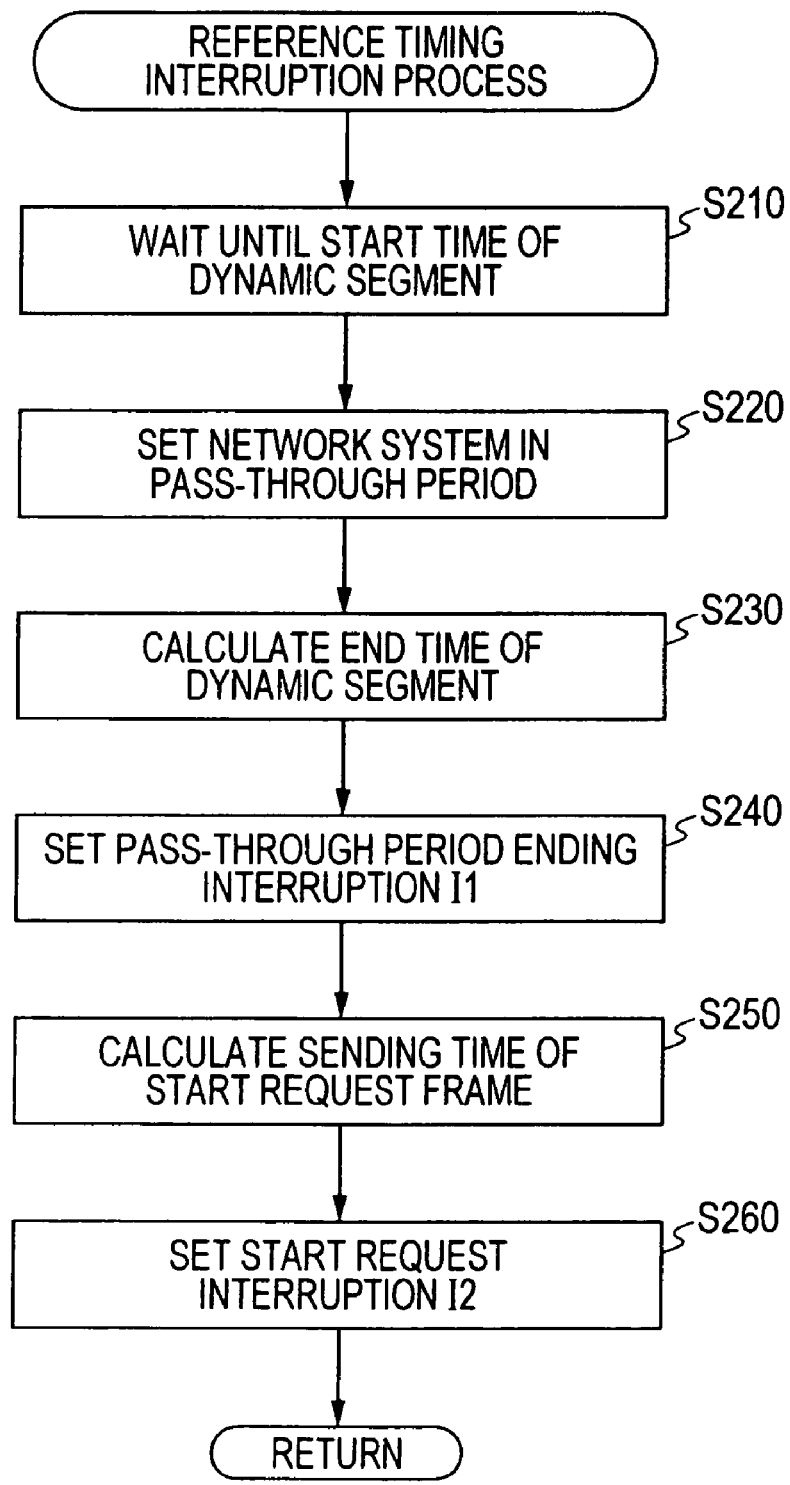
FIG. 8 is a flow chart showing a reference timing interruption process performed in each interchange terminal of the network system according to the first embodiment.

Next, the reference timing interruption process (see step S55 in FIG. 5) performed in each interchange terminal in response to the occurrence of a reference timing interruption will be described in detail with reference to FIG. 8. FIG. 8 is a flow chart showing a reference timing interruption process performed in each interchange terminal according to the first embodiment. As shown in FIG. 8, when a reference timing interruption set in one FlexRay communication frame occurs in the host network N1, at step S210, the microcomputer 13 of each interchange terminal waits until a start time of the dynamic segment of the FlexRay communication frame (i.e., a start time of one pass-through period). When the start time of the dynamic segment comes, at step S220, the microcomputer 13 sets the control port Pc at the high level. Therefore, the network system 1 is set in the pass-through period, and the transmission lines 91 and 92 of all the low-ranking networks N2 and N3 are connected with the transmission line 8 of the host network N1. The low-ranking connection terminals of each low-ranking network can communicate with any low-ranking connection terminals of the other low-ranking networks through the host network N1 during the pass-through period by using LIN communication frames without any protocol conversion of the LIN communication frames.

Then, at step S230, the microcomputer 13 calculates an end time T3 of the dynamic segment of the FlexRay communication frame. In other words, the microcomputer 13 calculates an end time T3 of the pass-through period. At step S240, the microcomputer 13 sets a timer to generate a pass-through period ending interruption I1 at the calculated end time T3. Therefore, the interruption I1 is set. At step S250, the microcomputer 13 calculates a sending time T4 of a start request frame directed to the corresponding low-ranking connection terminal (e.g., the ECU 6). This sending time T4 is calculated such that this start request frame is transmitted during the period of time (i.e., the non-pass-through period) for the static segment of the next FlexRay communication frame. At step S260, the microcomputer 13 sets another timer to generate a start request interruption I2 at the calculated sending time T4. Therefore, the interruption I2 is set. Then, this processing is ended.

Next, the pass-through period ending interruption process (see step S56 in FIG. 5) will be described in detail with reference to FIG. 9. FIG. 9 is a flow chart showing a pass-through period ending interruption process according to the first embodiment. Each interchange terminal performs this process in response to the occurrence of a pass-through period ending interruption I1. As shown in FIG. 9, when the end time T3 of the pass-through period comes, a pass-through period ending interruption I1 occurs in the microcomputer 13 of each interchange terminal. In response to the occurrence of this interruption I1, at step S310, the microcomputer 13 sets the control port Pc at the low level. Therefore, all the low-ranking networks N2 and N3 are separated from the host network N1 in data communication. Then, this processing is ended.

Next, the start request interruption process (see step S59 in FIG. 5) will be described in detail with reference to FIG. 10. FIG. 10 is a flow chart showing a start request interruption process according to the first embodiment. Each interchange terminal performs this process in response to the occurrence of a start request interruption I2. As shown in FIG. 10, when a start request interruption I2 occurs in the microcomputer 13 of each interchange terminal at the start timing T4, at step S410, the microcomputer 13 sends a start request frame to one corresponding low-ranking connection terminal (e.g., the ECU 6). Then, this processing is ended.

When receiving this start request frame, the low-ranking connection terminal (e.g., the ECU 6) specifies the start time of the pass-through period (i.e., the start time of the dynamic period of the FlexRay communication frame currently transmitted) from the reception timing of this frame. When the pass-through period has been started, the low-ranking connection terminal sends a LIN communication frame to another low-ranking connection terminal (e.g., the ECU 7) of another low-ranking network through the transmission line 8 of the host network N1 and the transmission lines 91 and 92 of the low-ranking networks N2 and N3. This LIN communication frame has a header and a response, or has only a header. When this frame has only a header, a low-ranking connection terminal indicated by the header outputs a response so as to follow the header of the frame, and the frame having the header and the response is sent to the low-ranking connection terminal (e.g., the ECU 7). In response to the reception of this frame, the low-ranking connection terminal performs a predetermined process according to the response of the frame.

Figure 11:
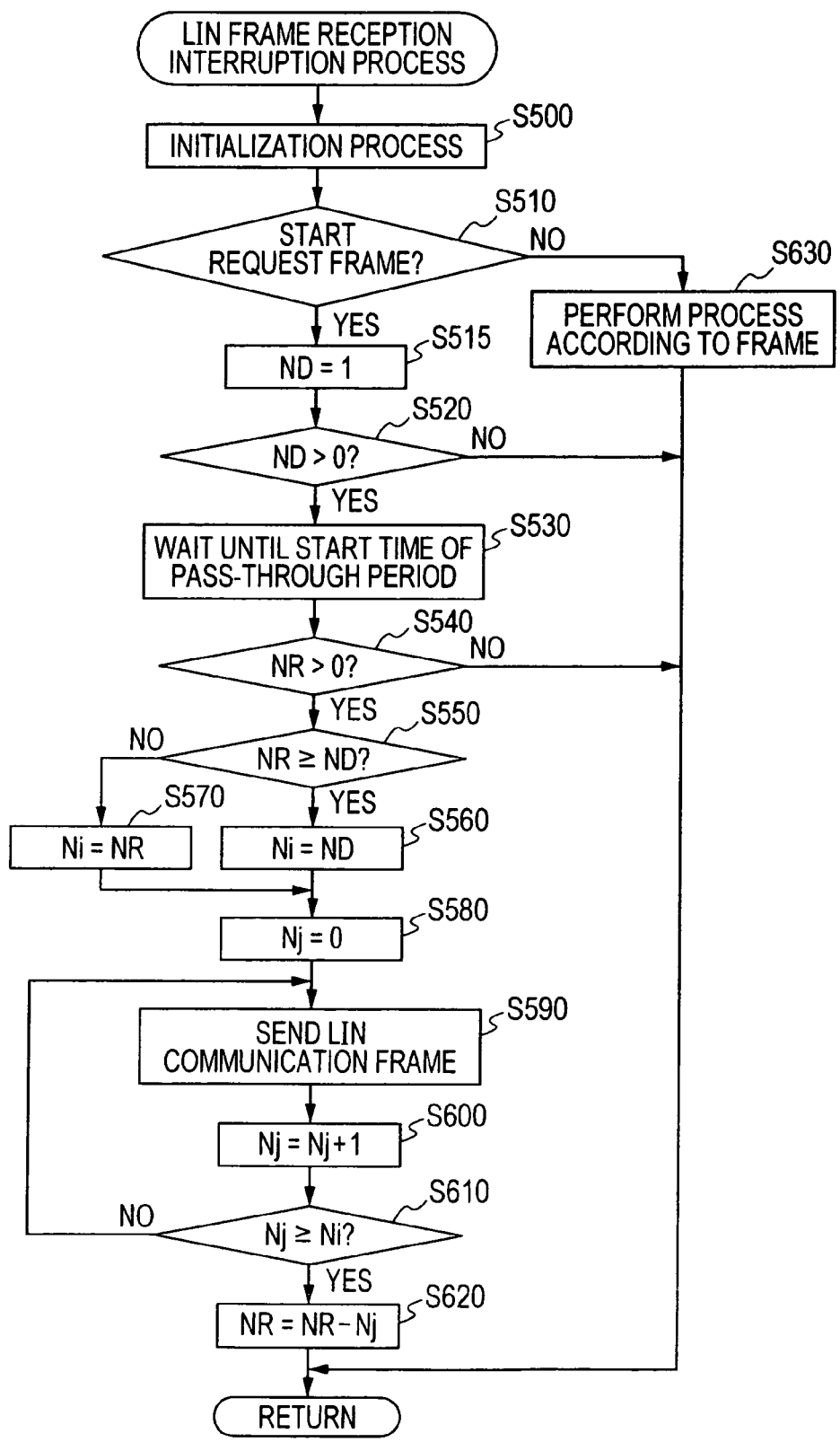
FIG. 11 is a flow chart showing a LIN frame reception interruption process performed in the network system according to the first embodiment.

Next, the LIN frame reception interrupt ion process (see steps S66 and S67 in FIG. 6) will be described in detail with reference to FIG. 11. FIG. 11 is a flow chart showing a LIN frame reception interruption process according to the first embodiment. Each of the low-ranking connection terminals (e.g., the ECU 6 or 7) of the low-ranking networks N2 and N3 and the interchange terminals (e.g., the ECU 2 or 5) performs this process in response to the reception of a LIN communication frame. As shown in FIG. 11, at step S500, each of all the low-ranking connection terminals and all the interchange terminals performs an initialization process. More specifically, a predetermined number ND is preset to zero in each terminal. This number ND denotes the number of LIN communication frames allowed to be sent from the terminal to another terminal during the pass-through period.

When one terminal (e.g., the ECU 2, 5, 6 or 7) receives a LIN communication frame, this terminal starts a LIN frame reception interruption process. Therefore, at step S510, the terminal judges whether or not the received frame is a start request frame. The start request frame is sent during the non-pass-through period from one interchange terminal (e.g., the ECU 2) set as the master node to one corresponding low-ranking connection terminal (e.g., the ECU 6) set as the slave node. When the frame received in the terminal is not a start request frame (NO at step S510), the terminal (e.g., the ECU 2, 5 or 7) receiving the frame judges that this received frame is sent during the pass-through period from one low-ranking connection terminal (e.g., the ECU 6) set as the master node to another low-ranking connection terminal (e.g., the ECU 7) set as the slave node through the interchange terminal (e.g., the ECU 2 or 5) set as the slave node of the host network N1. Then, at step S630, the terminal (e.g., the ECU 7) finally receiving the frame performs a predetermined process according to the request of the frame. Then, this processing is ended.

The LIN communication frame sent from the master node (e.g., the ECU 6) to one slave node (e.g., the ECU 7) during the pass-through period is composed of a header and a response. The header is outputted from the master node. The response is outputted from the master node or the slave node so as to follow the head. Therefore, the predetermined process at step S630 is performed only in the slave node (e.g., the ECU 7). When the header of the LIN communication frame specifies that the low-ranking connection terminal performing the predetermined process in response to the frame should prepares the response, the low-ranking connection terminal performing the predetermined process prepares data of the response so as to follow the header. When the header specifies that a low-ranking connection terminal different from the low-ranking connection terminal performing the predetermined process should prepares the response, the low-ranking connection terminal performing the predetermined process receives data of the response from the other low-ranking connection terminal preparing the response. The low-ranking connection terminal performing the predetermined process uses the received data of the response for various control operations performed by other processes of this low-ranking connection terminal.

In contrast, when the frame received in the terminal (e.g., the ECD 6) is a start request frame (YES at step S510), the terminal receiving the start request frame judges that the terminal is set as a master node in one pass-through period following this non-pass-through period. Then, at step S515, the number ND preset in this terminal is reset to a value higher than zero. For example, ND=1 is set. In contrast, ND=0 is maintained in the other terminals set as slave nodes in the pass-through period.

Then, at step S520, each terminal judges whether or not the number ND set in the terminal is larger than zero. When the number ND is not larger than zero (NO at step S520), the terminal judges that the terminal is set as a slave node during the pass-through period, and this processing is ended. In contrast, when the number ND is larger than zero (YES at step S520), the terminal judges that the terminal is set as a master node during the pass-through period and is allowed to output at least one LIN communication frame. Therefore, at step S530, the terminal waits until the start time T2 of the pass-through period.

When the start time T2 of the pass-through period comes, at step S540, the terminal sets the number of LIN communication frames not yet sent to other low-ranking connection terminals as a transmission request number NR, and the terminal judges whether or not the number NR is larger than zero. This number NR is set by another process performed in this terminal. When the number NR is not larger than zero (NO at step S540), the terminal judges that no LIN communication frame to be sent in this pass-through period exists, and this processing is ended. In contrast, when the number NR is larger than zero (YES at step S540), the terminal judges that at least one LIN communication frame to be sent in this pass-through period exists. Therefore, at step S550, the terminal judges whether or not the number NR is equal to or larger than the number ND.

When the number NR is equal to or larger than the number ND (YES at step S550), the terminal judges that the terminal cannot send all LIN communication frames having the number NR in this pass-through period but can send LIN communication frames set at the number ND in this pass-through period. Therefore, at step S560, the terminal sets an allowed sending number Ni at the number ND. Then, the procedure proceeds to step S580. In contrast, the number NR is smaller than the number ND (NO at step S550), the terminal judges that the terminal can send all LIN communication frames having the number NR in this pass-through period. Therefore, at step S570, the terminal sets the number NR as an allowed sending number Ni. Then, the procedure proceeds to step S580.

At step S580, the terminal clears a sending number Nj to zero. This number Nj denotes the number of LIN communication frames actually sent from this terminal in this pass-through period. At step S590, the terminal (e.g., the ECU 6) of this low-ranking network (e.g., the network N2) sends a header of one LIN communication frame from the low-ranking port Pl to one terminal (e.g., the ECU 7) of another low-ranking network (e.g., the network N3). When the terminal outputs the header specifying the terminal itself to the transmission line (e.g., the line 91), the terminal further outputs data of a response so as to follow the header. This response is prepared in another process performed in this terminal. At step S600, the number Nj is incremented by one (Nj=Nj+1). At step S610, the terminal judges whether or not the number Nj is equal to or larger than the number Ni.

When the number Nj is lower than the number Ni (NO at step S610), the terminal judges that the sending of LIN communication frames allowed in this pass-through period is not completed. Therefore, the procedure returns to step S590, and the terminal again outputs one LIN communication frame. In contrast, when the number Nj is equal to or larger than the number Ni (YES at step S610), the terminal judges that the sending of all LIN communication frames allowed in this pass-through period is completed. Therefore, at step S620, the number NR is reduced by the number Nj (NR=NR−Nj). Then, this processing is ended.

In this embodiment, the LIN communication protocol is used for the data communication performed in each low-ranking network. However, a CAN communication protocol employed for a controller area network (CAN) may be applied in each low-ranking network.

Second Embodiment

In the second embodiment, each of the low-ranking connection terminals and the interchange terminals in all the low-ranking networks receive and send CAN communication frames based on the CAN communication protocol to perform data communication among the terminals. As is well known, each CAN communication frame has an arbitration field used for arbitration in the case of frame collision, a control field used to specify the length of data, a data field used for the data, a cyclic redundancy check (CRC) field used for error checking, and the like.

The CAN communication protocol has the arbitration function performed when collision of CAN communication frames occurs on a transmission line, and one frame having the highest priority is selected in the arbitration and is transmitted through the transmission line. A CAN frame reception interruption process according to the second embodiment differs from the LIN frame reception interruption process (refer to FIG. 11) according to the first embodiment in that the arbitration is performed in response to the frame collision in the CAN frame reception interruption process.

Figure 12:
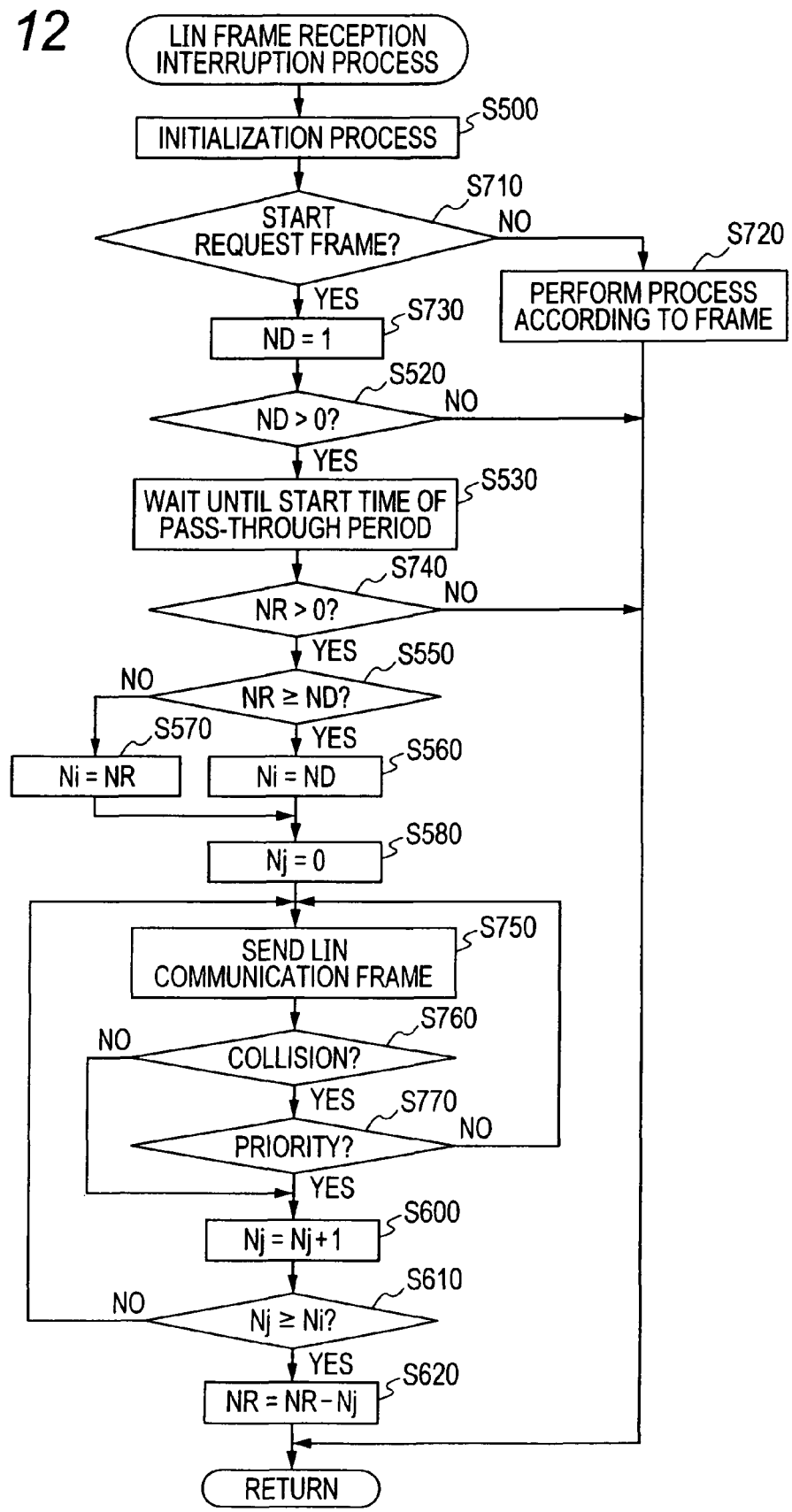
FIG. 12 is a flow chart showing a LIN frame reception interruption process performed in the network system according to the second embodiment.

This CAN frame reception interruption process will be described in detail with reference to FIG. 12. FIG. 12 is a flow chart showing a CAN frame reception interruption process according to the second embodiment. Each of the low-ranking connection terminals and the interchange terminals of the low-ranking networks N2 and N3 performs the CAN frame reception interruption process in response to the reception of one CAN communication frame.

As shown in FIG. 12, the processing at step S500 is performed in the same manner as in the first embodiment. Then, when one of the low-ranking connection terminals and the interchange terminals receives one CAN communication frame in one non-pass-through period, this terminal starts the CAN frame reception interruption process. Therefore, at step S710, the terminal judges whether or not the received frame is a start request frame. When the frame received in the terminal is not a start request frame (NO at step S710), at step S720, the terminal finally receiving the frame performs a predetermined process according to the frame. Then, this processing is ended.

In contrast, when the frame received in the terminal is a start request frame (YES at step S710), the terminal judges that the terminal is set as a master node in one pass-through period following this non-pass-through period. Then, at step S730, the number ND preset in this terminal is changed to a value higher than zero (ND>0). In contrast, ND=0 is maintained in the terminals not receiving any start request frame.

In this embodiment, a plurality of terminals among the low-ranking connection terminals and the interchange terminals of the low-ranking networks N2 and N3 receive start request frames in this non-pass-through period, respectively. In each terminal receiving the start request frame, ND>1 is set. Therefore, there is a probability that a plurality of terminals set at ND>1 simultaneously output a plurality of CAN communication frames in one pass-through period so as to cause frame collision. In this network system 1, the upper limit of the number of CAN communication frames possible to be transmitted one after another during one pass-through period is set at a maximum number Nmax. Therefore, the sum of the numbers ND set in the terminals receiving the start request frames is set to be equal to or smaller than this maximum number Nmax. For example, in each terminal receiving the start request frame, ND=1 is set.

Then, the processing at steps S520 and S530 are performed in the same manner as in the first embodiment. Then, at step S740, each of the terminals receiving the respective start request frames sets the number of CAN communication frames not yet sent to other low-ranking connection terminals as a transmission request number NR, and the terminal judges whether or not the number NR is larger than zero. When the number NR is not larger than zero (NO at step S740), the terminal judges that no CAN communication frame to be sent in this pass-through period exists, and this processing is ended. In contrast, when the number NR is larger than zero (YES at step S740), the terminal judges that there is at least one CAN communication frame to be sent in this pass-through period.

Then, the processing at steps S550, S560, S570 and S580 are performed in the same manner as in the first embodiment. Then, at step S750, each terminal receiving one start request frame outputs one CAN communication frame bit by bit from the low-ranking port Pl of the terminal to the corresponding transmission line 91 or 92.

During this outputting of the CAN communication frame, at step S760, the terminal checks the level of the transmission line and judges whether or not frame collision occurs on this transmission line due to another CAN communication frame which is outputted to the transmission line 91 or 92. When the level of each bit of the frame just outputted from the terminal is the same as the level of the transmission line currently set, the terminal judges that no frame collision occurs in the network system 1 (NO at step S760). At this case, the processing at steps S600, S610 and S620 are performed in the same manner as in the first embodiment. Then, this processing is ended.

In contrast, when the level of one bit of the frame just outputted from the terminal differs from the level of the transmission line, the terminal judges that frame collision occurs in the network system 1 (YES at step S760). At this case, at step S770, the terminal judges whether or not the frame outputted from the terminal has priority over other CAN communication frames outputted to the transmission line. When the frame outputted from the terminal has no priority (NO at step S770), the terminal stops outputting the CAN communication frame. Then, the procedure returns to S750, and the terminal again outputs the CAN communication frame bit by bit. In contrast, when the frame outputted from the terminal has priority (YES at step S770), the terminal continues outputting the CAN communication frame and successfully outputs this frame. Then, the processing at steps S600, S610 and S620 are performed in the same manner as in the first embodiment. Then, this processing is ended.

Accordingly, even when a plurality of terminals, respectively, receive start request frames and cause the collision of CAN communication frames in the network system 1, the CAN communication frames can be transmitted in the network system 1 in the order of priority.

In this embodiment, the start request frames are transmitted in one non-pass-through period. However, when the pass-through period is sufficiently long to transmit the start request frames and a plurality of CAN communication frames transmitted in response to the start request frames, the start request frames may be transmitted in one pass-through period.

MODIFICATIONS

These embodiments should not be construed as limiting the present invention to structures of those embodiments, and the structure of this invention may be combined with that based on the prior art. For example, in these embodiments, the interchange terminals set the period of the whole dynamic segment as one pass-through period. However, the interchange terminals may set the period of a part of each dynamic segment as one pass-through period.

Further, in these embodiments, the reference timing T1 is set at the start time of the final slot of each static segment (see FIG. 4). However, the reference timing T1 can be set at an arbitrary timing synchronized with each LIN or CAN communication frame. For example, the reference timing T1 may be set at the start time of each pass-through period. In this case, the processing at step S210 in the reference timing interruption process (see FIG. 8) can be omitted.

Moreover, when the period of the static segment is sufficiently longer than the transmission period of the start request frames, the reference timing T1 may be set at a time (e.g., the start time of the static segment) of the static segment earlier than the sending timing T4 of the start request frames. In this case, in the processing at step S260 in the reference timing interruption process (see FIG. 8), the sending timing of the start request frames is not set in the next LIN or CAN communication frame but is set in the LIN or CAN communication frame currently transmitted.

Figure 13:
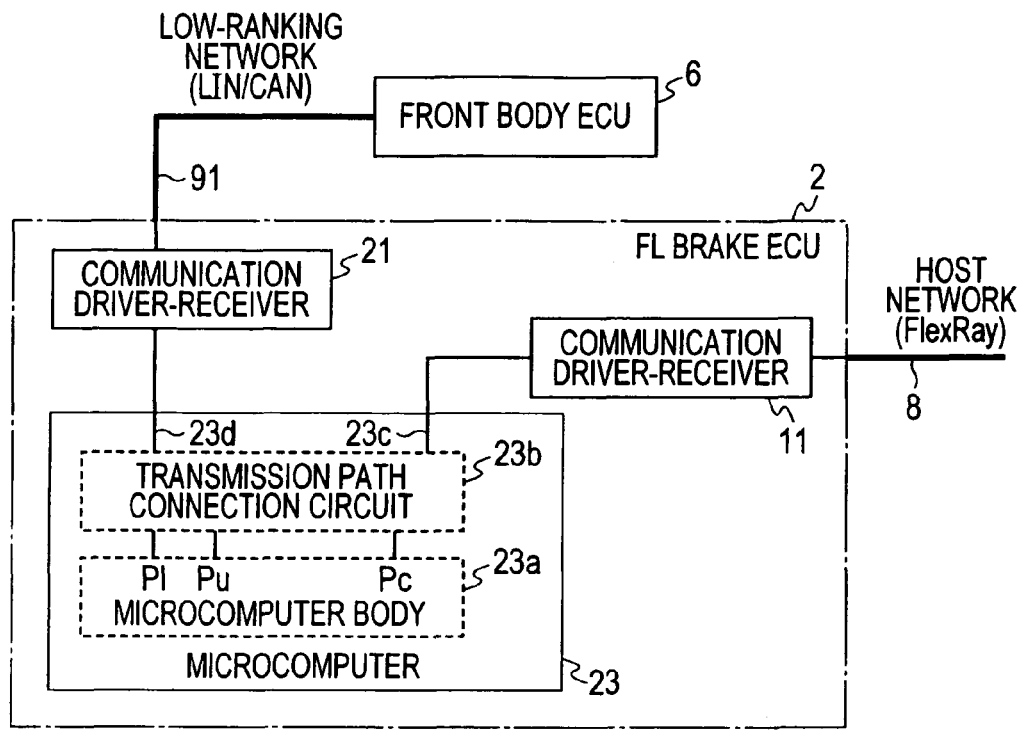
FIG. 13 is an explanatory view of an FL brake ECU acting as an interchange terminal in the network system according to a modification of the embodiments.

Furthermore, in these embodiments, each of the interchange terminals (e.g., the ECUs 2 and 5) has the communication driver-receiver 11, the communication driver-receiver 21, the transmission path connection circuit 12 and the microcomputer 13 separated from one another. However, as shown in FIG. 13, in place of the microcomputer 13 and the circuit 12, each interchange terminal (e.g., the ECU 2) may have a microcomputer 23 with a transmission path connection circuit which has a microcomputer body 23a having the same structure as the microcomputer 13, a transmission path connection circuit 23b having the same structure as the circuit 12, a first port 23c connecting the transmission line 8 of the host network N1 and the connection circuit 23b through the driver-receiver 11, and a second port 23d connecting the transmission line 91 of one low-ranking network (e.g., the network N2) and the connection circuit 23b through the driver-receiver 21. The microcomputer body 23a and the circuit 23b are integrally formed with each other.

The microcomputer body 23a controls the connection circuit 23b to directly connect the second port 23d with the first port 23c in each pass-through period and to separate the second port 23d from the first port 23c in the non-pass-through period. The data communication based on the LIN or CAN communication protocol can be performed in the pass-through period between one terminal (e.g., the ECU 5) of the low-ranking network (e.g., the network N2) and one terminal (e.g., the ECU 7) of the other low-ranking network (e.g., the network N3). The data communication based on the FlexRay communication protocol can be performed in each non-pass-through period between the microcomputer body 23a and one terminal (e.g., the ECU 3) of the host network N1.

Figure 14:
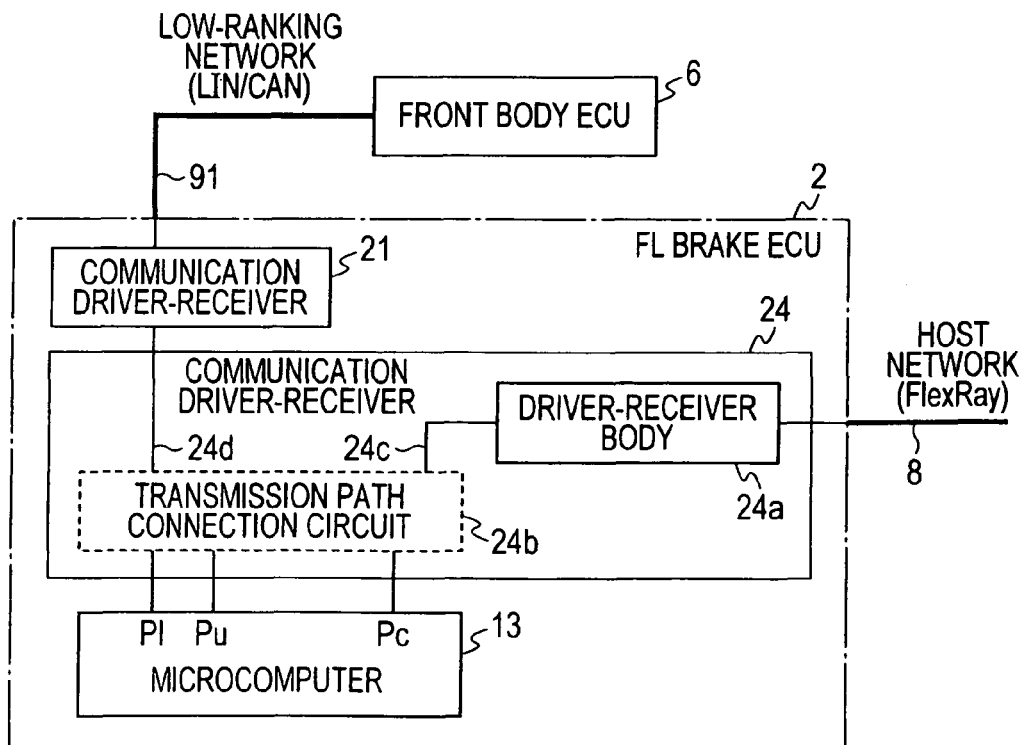
FIG. 14 is an explanatory view of an FL brake ECU acting as an interchange terminal in the network system according to another modification of the embodiments.

Still further, as shown in FIG. 14, in place of the driver-receiver 11 and the circuit 12, each interchange terminal (e.g., the ECU 2) may have a communication driver-receiver 24 with a transmission path connection circuit. This driver-receiver 24 has a driver-receiver body 24a having the same structure as the driver-receiver 11, a transmission path connection circuit 24b having the same structure as the circuit 12, a first driver-receiver transmission line 24c connecting the transmission line 8 of the host network N1 and the connection circuit 24b through the driver-receiver body 24a, and a second driver-receiver transmission line 24d connecting the transmission line (e.g. the line 91) of the low-ranking network (e.g., network N2) and the connection circuit 24b through the driver-receiver 21. The driver-receiver body 24a and the connection circuit 24b are integrally formed with each other.

The microcomputer 13 of the interchange terminal (e.g., the ECU 2) controls the connection circuit 24b to directly connect the first driver-receiver transmission line 24c and the second driver-receiver transmission line 24d in each pass-through period. Therefore, the transmission line 8 of the host network N1 is connected with the transmission line of the low-ranking network (e.g., the network N2). The microcomputer 13 of the interchange terminal (e.g., the ECU 2) controls the connection circuit 24b to separate the first driver-receiver transmission line 24c from the second driver-receiver transmission line 24d in each non-pass-through period. Therefore, the transmission line of the low-ranking network (e.g., the network N2) is separated from the transmission line 8 of the host network N1.

Still further, in place of the driver-receiver 21 and the circuit 12, each interchange terminal (e.g., the ECU 2) may have a communication driver-receiver with a transmission path connection circuit which has a driver-receiver body having the same structure as the driver-receiver 21, the transmission path connection circuit 24b, a first driver-receiver transmission line connected with the transmission line 8 of the host network N1 through the driver-receiver 11, and a second driver-receiver transmission line connected with the transmission line of the corresponding low-ranking network through the driver-receiver body. The driver-receiver body and the connection circuit 24b are integrally formed with each other.

What is claimed is:
1. A communication network system, comprising:
a high-ranking network in which a plurality of terminals containing a plurality of interchange terminals communicate with one another through a first communication line by employing a first communication protocol, the first communication protocol setting a fixed allocation period and a dynamic allocation period every communication period of a fixed length, communication zones being fixedly allocated to the respective terminals in each fixed allocation period, communication zones being changeably allocated to the respective terminals in each dynamic allocation period; and
a plurality of low-ranking networks connected with the high-ranking network through the respective interchange terminals, a plurality of low-ranking connection terminals in each low-ranking network communicating with one another through a second communication line by employing a second communication protocol different from the first communication protocol,
wherein the interchange terminals set at least a part of each dynamic allocation period as a pass-through period and connect the second communication lines of the low-ranking networks with the first communication line of the high-ranking network during each pass-through period to enable each low-ranking connection terminal of each low-ranking network to communicate with the low-ranking connection terminals of the other low-ranking networks through the high-ranking network during the pass-through period by employing the second communication protocol without any protocol conversion.

2. The system according to claim 1, wherein one interchange terminal connecting one low-ranking network and the high-ranking network sends a request frame to one low-ranking connection terminal of the low-ranking network to instruct the low-ranking connection terminal to send a communication frame based on the second communication protocol to one low-ranking connection terminal of another low-ranking network through the high-ranking network in one pass-through period in response to the request frame.

3. The system according to claim 1, wherein
the interchange terminals set each pass-through period such that a plurality of communication frames, which are prepared according to the second communication protocol and are set at a maximum number allowed in the network system, can be transmitted one after another in the pass-through period, and
the interchange terminals send a plurality of request frames one after another to low-ranking connection terminals so as to complete the sending of the request frames at a start time of one pass-through period, the low-ranking connection terminals preparing a plurality of communication frames, of which the number is equal to or smaller than the maximum number, according to the second communication protocol and sending the communication frames one after another to other-ranking connection terminals through the high-ranking network in the pass-through period in response to the request frames.

4. The system according to claim 1, wherein
the interchange terminals set each pass-through period such that a plurality of request frames and a plurality of communication frames based on the second communication protocol, which are set at a maximum number allowed in the network system and are transmitted in response to the request frames, can be transmitted one after another in the pass-through period, and
the interchange terminals start sending a plurality of request frames one after another to low-ranking connection terminals at a start time of one pass-through period,
the low-ranking connection terminals receiving the request frames prepare a plurality of communication frames based on the second communication protocol, of which the number is equal to or smaller than the maximum number, and send the communication frames one after another to other-ranking connection terminals through the high-ranking network in the pass-through period.

5. The system according to claim 1, wherein the first communication protocol is a FlexRay, the fixed allocation period is a period of a static segment of the communication frame prepared based on the FlexRay, and the dynamic allocation period is a period of a dynamic segment of the communication frame prepared based on the FlexRay.

6. The system according to claim 1, wherein a communication protocol for a controller area network or a local interconnect network is used as the second communication protocol.

7. An interchange terminal which connects a high-ranking network with one of a plurality of low-ranking networks for each of the low-ranking networks, a plurality of terminals containing the interchange terminals communicating with one another through a first communication line in the high-ranking network by employing a first communication protocol, communication zones being fixedly allocated to the respective terminals of the high-ranking network in each fixed allocation period, the first communication protocol setting a fixed allocation period and a dynamic allocation period every communication period of a fixed length, communication zones being changeably allocated to the respective terminals of the high-ranking network in each dynamic allocation period, a plurality of low-ranking connection terminals communicating with one another through a second communication line in each low-ranking network by employing a second communication protocol different from the first communication protocol, the interchange terminal corresponding to each low-ranking network comprising:
a control unit that sets at least a part of each dynamic allocation period as a pass-through period;
a transmission path connection unit that connects the communication line of the low-ranking network with the communication line of the high-ranking network during each pass-through period set by the control unit, each low-ranking connection terminal of the low-ranking network being enabled to communicate with the low-ranking connection terminals of the other low-ranking networks, of which the second communication lines are connected with the first communication line of the high-ranking network by the other interchange terminals, during each pass-through period without any protocol conversion; and
a request sending unit that sends a request frame to one low-ranking connection terminal of the low-ranking network to instruct the low-ranking connection terminal to send a communication frame based on the second communication protocol to one low-ranking connection terminal of another low-ranking network through the high-ranking network in one pass-through period in response to the request frame.

8. The interchange terminal according to claim 7, wherein
a network system having the low-ranking networks and the high-ranking network allows a maximum number of communication frames based on the second communication protocol to be transmitted one after another in the network system in each pass-through period,
the control units of the interchange terminals set each pass-through period such that a plurality of communication frames, which are prepared according to the second communication protocol and are set at the maximum number, can be transmitted one after another in the pass-through period, and
the request sending units of the interchange terminals send a plurality of request frames one after another to low-ranking connection terminals so as to complete the sending of the request frames at a start time of one pass-through period, the low-ranking connection terminals preparing a plurality of communication frames, of which the number is equal to or smaller than the maximum number, according to the second communication protocol and sending the communication frames one after another to other-ranking connection terminals through the high-ranking network in the pass-through period in response to the request frames.

9. The interchange terminal according to claim 7, wherein
a network system having the low-ranking networks and the high-ranking network allows a maximum number of communication frames based on the second communication protocol to be transmitted one after another in the network system in each pass-through period,
the control units of the interchange terminals set each pass-through period such that a plurality of request frames and a plurality of communication frames based on the second communication protocol, which are set at the maximum number and are transmitted in response to the request frames, can be transmitted one after another in the pass-through period, and the request sending units of the interchange terminals start sending a plurality of request frames one after another to low-ranking connection terminals at a start time of one pass-through period, the low-ranking connection terminals preparing a plurality of communication frames based on the second communication protocol, of which the number is equal to or smaller than the maximum number, and sending the communication frames one after another to other-ranking connection terminals through the high-ranking network in the pass-through period.

10. The interchange terminal according to claim 7, wherein the first communication protocol is a FlexRay, the fixed allocation period is a period of a static segment of the communication frame prepared based on the FlexRay, and the dynamic allocation period is a period of a dynamic segment of the communication frame prepared based on the FlexRay.

11. The interchange terminal according to claim 7, wherein a communication protocol for a controller area network or a local interconnect network is used as the second communication protocol.

12. A microcomputer of an interchange terminal comprising:
a first port connected with a transmission line of a high-ranking network in which a plurality of terminals containing the interchange terminal perform communication based on a first communication protocol, the first communication protocol setting a fixed allocation period and a dynamic allocation period every communication period of a fixed length, communication zones being fixedly allocated to the respective terminals of the high-ranking network in each fixed allocation period, communication zones being changeably allocated to the respective terminals of the high-ranking network in each dynamic allocation period;
a second port connected with a transmission line of a first low-ranking network in which a plurality of low-ranking connection terminals perform communication based on a second communication protocol different from the first communication protocol;
a transmission path connection circuit connected with the first port and the second port; and
a microcomputer body, integrally formed with the transmission path connection circuit, which sets at least a part of each dynamic allocation period as a pass-through period, sets each communication period other than the pass-through period as anon-pass-through period, controls the transmission path connection circuit to directly connect the second port with the first port in each pass-through period and to separate the second port from the first port in each non-pass-through period, communication based on the second communication protocol being enabled in the pass-through period between each low-ranking connection terminal of the first low-ranking network and a terminal of a second low-ranking network, having a transmission line connected with the transmission line of the high-ranking network, through the high-ranking network without any protocol conversion, communication based on the first communication protocol being performed in the non-pass-through period between the microcomputer body and one terminal of the high-ranking network.

13. The microcomputer according to claim 12, wherein the microcomputer body sends a request frame to the terminal of the first low-ranking network connected with the second port to instruct the terminal to send a communication frame based on the second communication protocol to the terminal of the second low-ranking network through the high-ranking network in the pass-through period in response to the request frame.

14. A communication driver-receiver of an interchange terminal, comprising:
a first driver-receiver transmission line connected with a transmission line of a high-ranking network in which a plurality of terminals containing the interchange terminal perform communication based on a first communication protocol, the first communication protocol setting a fixed allocation period and a dynamic allocation period every communication period of a fixed length, communication zones being fixedly allocated to the respective terminals of the high-ranking network in each fixed allocation period, communication zones being changeably allocated to the respective terminals of the high-ranking network in each dynamic allocation period;
a second driver-receiver transmission line connected with a transmission line of a low-ranking network in which a plurality of low-ranking connection terminals perform communication based on a second communication protocol different from the first communication protocol;
a driver-receiver body connected with an end of one of the driver-receiver transmission lines so as to locate the driver-receiver body between the driver-receiver transmission line and the corresponding network; and
a transmission path connection circuit, integrally formed with the driver-receiver body, which receives a first control signal indicating that at least a part of each dynamic allocation period is set as a pass-through period, receives a second control signal indicating that each communication period other than the pass-through period is set as a non-pass-through period, directly connects the first driver-receiver transmission line and the second driver-receiver transmission line in each pass-through period according to the first control signal to connect the transmission line of the high-ranking network and the transmission line of the low-ranking network through the driver-receiver body, and separates the first driver-receiver transmission line from the second driver-receiver transmission line in each non-pass-through period according to the second control signal to separate the transmission line of the low-ranking network from the transmission line of the high-ranking network.

* * * * *

UNITED STATES PATENT AND TRADEMARK OFFICE
CERTIFICATE OF CORRECTION

PATENT NO.        : 8,306,004 B2
APPLICATION NO.   : 12/932951
DATED             : November 6, 2012
INVENTOR(S)       : Masayuki Kobayashi It is certified that error appears in the above-identified patent and that said Letters Patent is hereby corrected as shown below:

Col. 25, line 49, claim 12, "anon" should be -- a non --

Signed and Sealed this
Fifth Day of March, 2013

Teresa Stanek Rea
*Acting Director of the United States Patent and Trademark Office*